United States Patent
Hosseini et al.

(10) Patent No.: US 11,558,864 B2
(45) Date of Patent: Jan. 17, 2023

(54) OUT-OF-ORDER PROCESSING

(71) Applicant: QUALCOMM Incorporated, San Diego, CA (US)

(72) Inventors: Seyedkianoush Hosseini, San Diego, CA (US); Peter Gaal, San Diego, CA (US); Alexei Yurievitch Gorokhov, San Diego, CA (US); Yi Huang, San Diego, CA (US); Joseph Binamira Soriaga, San Diego, CA (US); Jing Jiang, San Diego, CA (US); Amir Aminzadeh Gohari, Sunnyvale, CA (US); Aamod Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/790,716

(22) Filed: Feb. 13, 2020

(65) Prior Publication Data

US 2020/0267700 A1    Aug. 20, 2020

Related U.S. Application Data

(60) Provisional application No. 62/806,731, filed on Feb. 15, 2019.

(51) Int. Cl.
*H04W 72/04* (2009.01)
*H04L 5/00* (2006.01)
(Continued)

(52) U.S. Cl.
CPC ......... *H04W 72/042* (2013.01); *H04L 1/1812* (2013.01); *H04L 5/0053* (2013.01);
(Continued)

(58) Field of Classification Search
CPC ........... H04W 72/042; H04W 72/0413; H04W 72/1278; H04W 72/1247; H04L 5/0053; H04L 1/1812
See application file for complete search history.

(56) References Cited

U.S. PATENT DOCUMENTS 9,113,491 B2    8/2015   Montojo et al.
2003/0208601 A1  11/2003  Campbell et al.
(Continued)

FOREIGN PATENT DOCUMENTS

EP            1848163 A1    10/2007
WO    WO-2010016698 A2     2/2010
(Continued)

OTHER PUBLICATIONS

Vivo Remaining issues on UL data transmission for URLLC May 2018 R1-1806070 (Year: 2018).*
(Continued)

*Primary Examiner* — Mahbubul Bar Chowdhury
(74) *Attorney, Agent, or Firm* — Holland & Hart LLP

(57) ABSTRACT

Methods, systems, and devices for wireless communications at a user equipment (UE) are described. Techniques are described herein for performing out-of-order processing. The UE may receive a first downlink channel at a first time and a second downlink channel at a second time. The UE may determine that a priority of the second downlink channel is different (e.g., higher) than a priority of the first downlink channel. The UE may determine that a first uplink transmission associated with the first downlink channel is to be transmitted after a second uplink transmission associated with the second channel based on the different priorities. The UE may set one or more operations based on these deter-
(Continued)

minations. In some cases, the UE may suspend processing the of the first downlink channel to process the second downlink channel.

27 Claims, 12 Drawing Sheets

(51) Int. Cl.
   *H04W 72/12* (2009.01)
   *H04L 1/18* (2006.01)
(52) U.S. Cl.
   CPC ... *H04W 72/0413* (2013.01); *H04W 72/1247* (2013.01); *H04W 72/1278* (2013.01)

(56) References Cited

U.S. PATENT DOCUMENTS

| | | | |
|---|---|---|---|
| 2005/0201358 A1 | 9/2005 | Nelson et al. | |
| 2012/0320846 A1 | 12/2012 | Papasakellariou et al. | |
| 2013/0230017 A1 | 9/2013 | Papasakellariou et al. | |
| 2018/0279277 A1 | 9/2018 | Park et al. | |
| 2019/0053212 A1* | 2/2019 | Liu | H04L 5/0082 |
| 2019/0132780 A1* | 5/2019 | Hahn | H04W 36/30 |
| 2019/0223204 A1* | 7/2019 | Kim | H04L 1/1887 |
| 2019/0239196 A1* | 8/2019 | Lee | H04W 72/0413 |
| 2019/0363843 A1* | 11/2019 | Gordaychik | H04L 1/1854 |
| 2020/0053765 A1* | 2/2020 | Chien | H04L 1/1854 |
| 2020/0053766 A1* | 2/2020 | Chien | H04L 1/1861 |
| 2021/0211241 A1* | 7/2021 | Xiong | H04W 72/042 |
| 2021/0376985 A1* | 12/2021 | Zhou | H04L 5/0007 |

FOREIGN PATENT DOCUMENTS

| | | |
|---|---|---|
| WO | WO-2011011636 A2 | 1/2011 |
| WO | WO-2011074116 A1 | 6/2011 |
| WO | WO-2017153418 A1 | 9/2017 |
| WO | WO-2020022850 A1 | 1/2020 |

OTHER PUBLICATIONS

Partial International Search Report—PCT/US2020/018376—ISA/EPO—dated May 19, 2020.
International Search Report and Written Opinion—PCT/US2020/018376—ISA/EPO—dated Sep. 2, 2020.
3GPP TS 38.214, "3rd Generation Partnership Project; Technical Specification Group Radio Access Network; NR; Physical Layer Procedures for Data (Release 15)", 3GPP TS 38.214, V15.4.0, Dec. 2018, pp. 1-102.
Ericsson: "Intra-UE Prioritization and Multiplexing of UL Transmissions", R1-1812157, TSG-RAN WG1 Meeting#95, Spokane, USA, Nov. 12-16, 2018, 3 pages.
Vivo: "Enhancement for Scheduling/HARQ/CSI Processing Timeline", R1-1812315, 3GPP TSG RAN WG1 Meeting #95, Spokane, USA, Nov. 12-16, 2018, pp. 1-3.
Qualcomm Incorporated: "Summary #1 of Enhancements to Scheduling/HARQ", R1-1913284, 3GPP TSG-RAN WG1 Meeting #99, Reno, Nevada, U.S.A, Nov. 18-22, 2019, pp. 1-43.

* cited by examiner

OUT-OF-ORDER PROCESSING

CROSS REFERENCE

The present Application for patent claims the benefit of U.S. Provisional Patent Application No. 62/806,731 by HOSSEINI et al., entitled "OUT-OF-ORDER PROCESSING," filed Feb. 15, 2019, assigned to the assignee hereof, and expressly incorporated by reference herein.

BACKGROUND

The following relates generally to wireless communications at a user equipment (UE), and more specifically to out-of-order processing.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as UEs.

SUMMARY

The described techniques relate to improved methods, systems, devices, and apparatuses that support out-of-order processing. Generally, the described techniques provide for performing out-of-order processing of information related to signals. A user equipment (UE) may receive a first downlink channel at a first time and a second channel at a second time. In some cases the second channel may be a second downlink channel. The UE may determine that a priority of the second channel is different (e.g., higher) than a priority of the first downlink channel. The UE may determine that a first uplink transmission associated with the first downlink channel is to be transmitted (e.g., out-of-order) after a second uplink transmission associated with the second channel based on the different priorities. The UE may set one or more operations based on these determinations. In some cases, the UE may suspend (e.g., drop) processing the of the first downlink channel to process the second channel.

A method of wireless communication at a UE is described. The method may include detecting first information over a first downlink channel at a first time, detecting downlink control information (DCI) associated with a second channel at a second time after the first time, determining that the transmission resources of the first downlink channel overlap in time with the transmission resources of the second channel, suspending processing information associated with the first downlink channel based on determining that the transmission resources overlap, extending a minimum procedure timing associated with the second channel based on suspending processing the information associated with the first downlink channel, and processing the second channel based on extending the minimum procedure timing.

An apparatus for wireless communication at a UE is described. The apparatus may include a processor, memory coupled with the processor, and instructions stored in the memory. The instructions may be executable by the processor to cause the apparatus to detect first information over a first downlink channel at a first time, detect DCI associated with a second channel at a second time after the first time, determine that the transmission resources of the first downlink channel overlap in time with the transmission resources of the second channel, suspend processing information associated with the first downlink channel based on determining that the transmission resources overlap, extend a minimum procedure timing associated with the second channel based on suspending processing the information associated with the first downlink channel, and process the second channel based on extending the minimum procedure timing.

Another apparatus for wireless communication at a UE is described. The apparatus may include means for detecting first information over a first downlink channel at a first time, detecting DCI associated with a second channel at a second time after the first time, determining that the transmission resources of the first downlink channel overlap in time with the transmission resources of the second channel, suspending processing information associated with the first downlink channel based on determining that the transmission resources overlap, extending a minimum procedure timing associated with the second channel based on suspending processing the information associated with the first downlink channel, and processing the second channel based on extending the minimum procedure timing.

A non-transitory computer-readable medium storing code for wireless communication at a UE is described. The code may include instructions executable by a processor to detect first information over a first downlink channel at a first time, detect DCI associated with a second channel at a second time after the first time, determine that the transmission resources of the first downlink channel overlap in time with the transmission resources of the second channel, suspend processing information associated with the first downlink channel based on determining that the transmission resources overlap, extend a minimum procedure timing associated with the second channel based on suspending processing the information associated with the first downlink channel, and process the second channel based on extending the minimum procedure timing.

In some examples of the method, apparatuses, and non-transitory computer-readable medium described herein, the second channel includes a downlink channel, and the minimum procedure timing includes a minimum processing timing to process the DCI received over the second channel.

In some examples of the method, apparatuses, and non-transitory computer-readable medium described herein, the second channel may be an uplink channel, and the minimum procedure timing includes a minimum preparation timing of the second channel.

Some examples of the method, apparatuses, and non-transitory computer-readable medium described herein may further include operations, features, means, or instructions for identifying an offset for the minimum procedure timing based on processing the first downlink channel, where extending the minimum procedure timing based on processing the first downlink channel, where extending the minimum procedure timing may be based on identifying the offset, where identifying the offset for the minimum procedure timing may be based on a UE capability, a subcarrier spacing (SCS), a timing capability associated with the first downlink channel, a timing capability associated with the second channel, or any combination thereof.

Some examples of the method, apparatuses, and non-transitory computer-readable medium described herein may further include operations, features, means, or instructions for setting an operation for processing the downlink channels of the UE based on determining that there may be the overlap of the first downlink channel and the second channel, where suspending processing of the information may be based on setting the operation for processing, identifying a trigger event associated with a third channel after setting the operation for processing the channels of the UE, and maintaining a priority of the first downlink channel based on identifying the trigger event.

In some examples of the method, apparatuses, and non-transitory computer-readable medium described herein, the operation for processing the channels of the UE may be fixed after setting the operation, and a priority of the first downlink channel may be unchanged after setting the operation for processing the downlink channels of the UE.

Some examples of the method, apparatuses, and non-transitory computer-readable medium described herein may further include operations, features, means, or instructions for determining that processing the information associated with the first downlink channel may be capable of being suspended, where setting the operation may be based on determining that processing the information associated with the first downlink channel may be capable of being dropped.

Some examples of the method, apparatuses, and non-transitory computer-readable medium described herein may further include operations, features, means, or instructions for determining whether a joint scheduling condition for processing the first downlink channel and the second channel concurrently may be satisfied based on a processing capability of the UE, where the suspension of processing the information of the first downlink channel may be based on the joint scheduling condition failing to be satisfied.

Some examples of the method, apparatuses, and non-transitory computer-readable medium described herein may further include operations, features, means, or instructions for identifying a quantity of parameters associated with processing the first downlink channel and processing the second channel, where determining whether the joint scheduling condition may be satisfied may be based on identifying the quantity of parameters, where the parameters include resource blocks, transport blocks, layers, or both.

Some examples of the method, apparatuses, and non-transitory computer-readable medium described herein may further include operations, features, means, or instructions for extending a minimum procedure timing associated the second channel based on determining whether the joint scheduling condition may be satisfied, and processing the second channel based on extending the minimum procedure timing.

Some examples of the method, apparatuses, and non-transitory computer-readable medium described herein may further include operations, features, means, or instructions for identifying the first priority of the first downlink channel based on detecting the first information, identifying the second priority of the second channel based on detecting the DCI, and identifying the second priority may be greater than the first priority based on identifying the first priority and the second priority.

Some examples of the method, apparatuses, and non-transitory computer-readable medium described herein may further include operations, features, means, or instructions for identifying a field in the first information based on detecting the first information, where identifying the first priority may be based on the field in the first information, and identifying a field in the DCI based on detecting the DCI, where identifying the second priority may be based on the field in the DCI.

Some examples of the method, apparatuses, and non-transitory computer-readable medium described herein may further include operations, features, means, or instructions for identifying an uplink timing associated with the first downlink channel based on detecting the first information, where identifying the first priority may be based on the uplink timing associated with the first downlink channel, and identifying an uplink timing associated with the second channel based on detecting the DCI, where identifying the second priority may be based on the uplink timing associated with the second channel.

In some examples of the method, apparatuses, and non-transitory computer-readable medium described herein, the first downlink channel includes a first physical downlink shared channel (PDSCH) and the second channel includes a second PDSCH, the uplink transmission associated with the first downlink channel includes a hybrid automatic repeat request (HARQ) acknowledgement (ACK) or a HARQ negative acknowledgement (NACK) and the uplink transmission associated with the second channel includes a HARQ ACK or a HARQ NACK, and the HARQ ACK or the HARQ NACK may be transmitted over a physical uplink control channel (PUCCH).

In some examples of the method, apparatuses, and non-transitory computer-readable medium described herein, the first downlink channel includes a first physical downlink control channel (PDCCH) and the second channel includes a second PDCCH, and the uplink transmission associated with the first downlink channel includes a first physical uplink shared channel (PUSCH) transmission and the uplink transmission associated with the second channel includes a second PUSCH.

In some examples of the method, apparatuses, and non-transitory computer-readable medium described herein, the first downlink channel and the second channel may be associated with an active bandwidth part of a serving cell.

In some examples of the method, apparatuses, and non-transitory computer-readable medium described herein, the first downlink channel and the second channel may be associated with different serving cells.

In some examples of the method, apparatuses, and non-transitory computer-readable medium described herein, the first downlink channel and the second channel may be associated with a same serving cell.

Some examples of the method, apparatuses, and non-transitory computer-readable medium described herein may further include operations, features, means, or instructions for identifying that a HARQ process identifier associated with the first downlink channel may be different than a HARQ process identifier associated with the second channel, where determining that the uplink transmission associated with the second channel comes before the uplink transmission associated with the first downlink channel may be based on identifying that the HARQ process identifier associated with the first downlink channel may be different than the HARQ process identifier associated with the second channel.

Some examples of the method, apparatuses, and non-transitory computer-readable medium described herein may further include operations, features, means, or instructions for identifying a first offset for a first minimum procedure timing associated with downlink communication, and identifying a second offset for a second minimum procedure timing associated with uplink communication separate from identifying the first offset for the first minimum procedure timing associated with the downlink communication.

A method of wireless communication at a UE is described. The method may include detecting first information over a first downlink channel at a first time, detecting DCI over a second channel at a second time after the first time, determining whether an uplink transmission associated with the second channel comes before or after an uplink transmission associated with the first downlink channel, setting an operation for processing the channels of the UE based on determining whether the uplink transmission associated with the second channel comes before or after the uplink transmission associated with the first downlink channel, determining that the uplink transmission associated with the second channel comes before the uplink transmission associated with the first downlink channel based on setting the operation for processing the channels of the UE, and determining an error based on determining that the uplink transmission associated with the second channel comes before the uplink transmission associated with the first downlink channel.

An apparatus for wireless communication at a UE is described. The apparatus may include a processor, memory coupled with the processor, and instructions stored in the memory. The instructions may be executable by the processor to cause the apparatus to detect first information over a first downlink channel at a first time, detect DCI over a second channel at a second time after the first time, determine whether an uplink transmission associated with the second channel comes before or after an uplink transmission associated with the first downlink channel, set an operation for processing the channels of the UE based on determining whether the uplink transmission associated with the second channel comes before or after the uplink transmission associated with the first downlink channel, determine that the uplink transmission associated with the second channel comes before the uplink transmission associated with the first downlink channel based on setting the operation for processing the channels of the UE, and determine an error based on determining that the uplink transmission associated with the second channel comes before the uplink transmission associated with the first downlink channel.

Another apparatus for wireless communication at a UE is described. The apparatus may include means for detecting first information over a first downlink channel at a first time, detecting DCI over a second channel at a second time after the first time, determining whether an uplink transmission associated with the second channel comes before or after an uplink transmission associated with the first downlink channel, setting an operation for processing the channels of the UE based on determining whether the uplink transmission associated with the second channel comes before or after the uplink transmission associated with the first downlink channel, determining that the uplink transmission associated with the second channel comes before the uplink transmission associated with the first downlink channel based on setting the operation for processing the channels of the UE, and determining an error based on determining that the uplink transmission associated with the second channel comes before the uplink transmission associated with the first downlink channel.

A non-transitory computer-readable medium storing code for wireless communication at a UE is described. The code may include instructions executable by a processor to detect first information over a first downlink channel at a first time, detect DCI over a second channel at a second time after the first time, determine whether an uplink transmission associated with the second channel comes before or after an uplink transmission associated with the first downlink channel, set an operation for processing the channels of the UE based on determining whether the uplink transmission associated with the second channel comes before or after the uplink transmission associated with the first downlink channel, determine that the uplink transmission associated with the second channel comes before the uplink transmission associated with the first downlink channel based on setting the operation for processing the channels of the UE, and determine an error based on determining that the uplink transmission associated with the second channel comes before the uplink transmission associated with the first downlink channel.

Some examples of the method, apparatuses, and non-transitory computer-readable medium described herein may further include operations, features, means, or instructions for detecting a second DCI over a third channel at a fourth time after the second time, where determining that the uplink transmission associated with the second channel comes before the uplink transmission associated with the first downlink channel may be based on detecting the second DCI.

Some examples of the method, apparatuses, and non-transitory computer-readable medium described herein may further include operations, features, means, or instructions for multiplexing the uplink transmission associated with the second channel with an uplink transmission associated with the third channel based on detecting the second DCI, where determining that the uplink transmission associated with the second channel comes before the uplink transmission associated with the first downlink channel may be based on multiplexing the uplink transmission associated with the second channel with the uplink transmission associated with the third channel.

Some examples of the method, apparatuses, and non-transitory computer-readable medium described herein may further include operations, features, means, or instructions for determining that a priority of the second channel changes from a first priority to a second priority greater than the first priority based on detecting the second DCI, where determining that the uplink transmission associated with the second channel comes before the uplink transmission associated with the first downlink channel may be based on determining that the priority of the second channel changes from the first priority to the second priority.

Some examples of the method, apparatuses, and non-transitory computer-readable medium described herein may further include operations, features, means, or instructions for reducing a speed of processing information associated with the second channel based on determining that the uplink transmission associated with the second channel comes before the uplink transmission associated with the first downlink channel.

In some examples of the method, apparatuses, and non-transitory computer-readable medium described herein, the operation for processing the channels of the UE may be fixed after setting the operation.

Some examples of the method, apparatuses, and non-transitory computer-readable medium described herein may further include operations, features, means, or instructions for determining that a joint scheduling condition for processing the first downlink channel and the second channel concurrently may be satisfied based on a processing capability of the UE, where the setting the operation may be based on the joint scheduling condition being satisfied.

In some examples of the method, apparatuses, and non-transitory computer-readable medium described herein, the first downlink channel and the second channel may be associated with an active bandwidth part of a serving cell.

A method of wireless communication at a UE is described. The method may include detecting first DCI over a first downlink channel at a first time, detecting second DCI over a second downlink channel at a second time after the first time, determining that an uplink transmission associated with the second downlink channel comes before an uplink transmission associated with the first downlink channel, setting an operation for processing the downlink channels of the UE based on determining that the uplink transmission associated with the second downlink channel comes before the uplink transmission associated with the first downlink channel, and suspending processing information associated with the first downlink channel based on setting the operation.

An apparatus for wireless communication at a UE is described. The apparatus may include a processor, memory in electronic communication with the processor, and instructions stored in the memory. The instructions may be executable by the processor to cause the apparatus to detect first DCI over a first downlink channel at a first time, detect second DCI over a second downlink channel at a second time after the first time, determine that an uplink transmission associated with the second downlink channel comes before an uplink transmission associated with the first downlink channel, set an operation for processing the downlink channels of the UE based on determining that the uplink transmission associated with the second downlink channel comes before the uplink transmission associated with the first downlink channel, and suspend processing information associated with the first downlink channel based on setting the operation.

Another apparatus for wireless communication at a UE is described. The apparatus may include means for detecting first DCI over a first downlink channel at a first time, detecting second DCI over a second downlink channel at a second time after the first time, determining that an uplink transmission associated with the second downlink channel comes before an uplink transmission associated with the first downlink channel, setting an operation for processing the downlink channels of the UE based on determining that the uplink transmission associated with the second downlink channel comes before the uplink transmission associated with the first downlink channel, and suspending processing information associated with the first downlink channel based on setting the operation.

A non-transitory computer-readable medium storing code for wireless communication at a UE is described. The code may include instructions executable by a processor to detect first DCI over a first downlink channel at a first time, detect second DCI over a second downlink channel at a second time after the first time, determine that an uplink transmission associated with the second downlink channel comes before an uplink transmission associated with the first downlink channel, set an operation for processing the downlink channels of the UE based on determining that the uplink transmission associated with the second downlink channel comes before the uplink transmission associated with the first downlink channel, and suspend processing information associated with the first downlink channel based on setting the operation.

Some examples of the method, apparatuses, and non-transitory computer-readable medium described herein may further include operations, features, means, or instructions for extending a preparation timing associated with the second downlink channel based on suspending processing the information associated with the first downlink channel, and processing the second downlink channel based on extending the preparation timing.

In some examples of the method, apparatuses, and non-transitory computer-readable medium described herein, the preparation timing includes a minimum processing timing of the second downlink channel.

Some examples of the method, apparatuses, and non-transitory computer-readable medium described herein may further include operations, features, means, or instructions for identifying an offset for the preparation timing based on processing the first downlink channel, where extending the preparation timing may be based on identifying the offset.

Some examples of the method, apparatuses, and non-transitory computer-readable medium described herein may further include operations, features, means, or instructions for identifying the offset for the preparation timing based at least in part on a UE capability, an SCS, a timing capability associated with the first downlink channel, a timing capability associated with the second downlink channel, or any combination thereof.

Some examples of the method, apparatuses, and non-transitory computer-readable medium described herein may further include operations, features, means, or instructions for identifying a first offset for a first preparation timing associated with downlink communication; and identifying a second offset for a second preparation timing associated with uplink communication separate from identifying the first offset for the first preparation timing associated with the downlink communication.

Some examples of the method, apparatuses, and non-transitory computer-readable medium described herein may further include operations, features, means, or instructions for identifying a trigger event associated with a third downlink channel after setting the operation for processing the downlink channels of the UE, and maintaining a priority of the first downlink channel based on identifying the trigger event.

In some examples of the method, apparatuses, and non-transitory computer-readable medium described herein, the operation for processing the downlink channels of the UE may be fixed after setting the operation.

In some examples of the method, apparatuses, and non-transitory computer-readable medium described herein, a priority of the first downlink channel may be unchanged after setting the operation for processing the downlink channels of the UE.

Some examples of the method, apparatuses, and non-transitory computer-readable medium described herein may further include operations, features, means, or instructions for determining whether a joint scheduling condition for processing the first downlink channel and the second downlink channel concurrently may be satisfied based on a processing capability of the UE, where the suspension of processing the information of the first downlink channel may be based on the joint scheduling condition failing to be satisfied.

Some examples of the method, apparatuses, and non-transitory computer-readable medium described herein may further include operations, features, means, or instructions for identifying a quantity of parameters associated with processing the first downlink channel and processing the second downlink channel, where determining whether the joint scheduling condition may be satisfied may be based on identifying the quantity of parameters.

In some examples of the method, apparatuses, and non-transitory computer-readable medium described herein, the parameters include resource blocks, transport blocks, layers, or both.

Some examples of the method, apparatuses, and non-transitory computer-readable medium described herein may further include operations, features, means, or instructions for extending a preparation timing associated the second downlink channel based on determining whether the joint scheduling condition may be satisfied, and processing the second downlink channel based on extending the preparation timing.

Some examples of the method, apparatuses, and non-transitory computer-readable medium described herein may further include operations, features, means, or instructions for identifying that a second priority of the second downlink channel may be greater than a first priority of the first downlink channel based on detecting the first DCI, where determining that the uplink transmission associated with the second downlink channel comes before the uplink transmission associated with the first downlink channel may be based on identifying that the second priority may be greater than the first priority.

Some examples of the method, apparatuses, and non-transitory computer-readable medium described herein may further include operations, features, means, or instructions for identifying the first priority of the first downlink channel based on detecting the first DCI, and identifying the second priority of the second downlink channel based on detecting the second DCI, where identifying that the second priority may be greater than the first priority may be based on identifying the first priority and the second priority.

Some examples of the method, apparatuses, and non-transitory computer-readable medium described herein may further include operations, features, means, or instructions for identifying a field in the first DCI based on detecting the first DCI, where identifying the first priority may be based on the field in the first DCI, and identifying a field in the second DCI based on detecting the second DCI, where identifying the second priority may be based on the field in the second DCI.

Some examples of the method, apparatuses, and non-transitory computer-readable medium described herein may further include operations, features, means, or instructions for identifying an uplink timing associated with the first downlink channel based on detecting the first DCI, where identifying the first priority may be based on the uplink timing associated with the first downlink channel, and identifying an uplink timing associated with the second downlink channel based on detecting the second DCI, where identifying the second priority may be based on the uplink timing associated with the second downlink channel.

In some examples of the method, apparatuses, and non-transitory computer-readable medium described herein, the first downlink channel includes a first PDSCH and the second downlink channel includes a second PDSCH, and the uplink transmission associated with the first downlink channel includes a HARQ ACK or a HARQ NACK and the uplink transmission associated with the second downlink channel includes a HARQ ACK or a HARQ NACK.

In some examples of the method, apparatuses, and non-transitory computer-readable medium described herein, the HARQ ACK or the HARQ NACK may be transmitted over a PUCCH.

In some examples of the method, apparatuses, and non-transitory computer-readable medium described herein, the first downlink channel includes a first PDCCH and the second downlink channel includes a second PDCCH, and the uplink transmission associated with the first downlink channel includes a first PUSCH transmission and the uplink transmission associated with the second downlink channel includes a second PUSCH.

In some examples of the method, apparatuses, and non-transitory computer-readable medium described herein, the first downlink channel and the second downlink channel may be associated with an active bandwidth part of a serving cell.

In some examples of the method, apparatuses, and non-transitory computer-readable medium described herein, the first downlink channel and the second downlink channel may be associated with different serving cells.

In some examples of the method, apparatuses, and non-transitory computer-readable medium described herein, the first downlink channel and the second downlink channel may be associated with a same serving cell.

Some examples of the method, apparatuses, and non-transitory computer-readable medium described herein may further include operations, features, means, or instructions for identifying that a HARQ process identifier associated with the first downlink channel may be different than a HARQ process identifier associated with the second downlink channel, where determining that the uplink transmission associated with the second downlink channel comes before the uplink transmission associated with the first downlink channel may be based on identifying that the HARQ process identifier associated with the first downlink channel may be different than the HARQ process identifier associated with the second downlink channel.

Some examples of the method, apparatuses, and non-transitory computer-readable medium described herein may further include operations, features, means, or instructions for determining that processing the information associated with the first downlink channel may be capable of being suspended, where setting the operation may be based on determining that processing the information associated with the first downlink channel may be capable of being dropped.

A method of wireless communication at a UE is described. The method may include detecting first DCI over a first downlink channel at a first time, detecting second DCI over a second downlink channel at a second time after the first time, determining whether an uplink transmission associated with the second downlink channel comes before or after an uplink transmission associated with the first downlink channel, setting an operation for processing the downlink channels of the UE based on determining whether the uplink transmission associated with the second downlink channel comes before or after the uplink transmission associated with the first downlink channel, determining that the uplink transmission associated with the second downlink channel comes before the uplink transmission associated with the first downlink channel based on setting the operation for processing the downlink channels of the UE, and determining an error based on determining that the uplink transmission associated with the second downlink channel comes before the uplink transmission associated with the first downlink channel.

An apparatus for wireless communication at a UE is described. The apparatus may include a processor, memory in electronic communication with the processor, and instructions stored in the memory. The instructions may be executable by the processor to cause the apparatus to detect first DCI over a first downlink channel at a first time, detect second DCI over a second downlink channel at a second time after the first time, determine whether an uplink transmission associated with the second downlink channel comes before or after an uplink transmission associated with the first downlink channel, set an operation for processing the downlink channels of the UE based on determining whether the uplink transmission associated with the second downlink channel comes before or after the uplink transmission associated with the first downlink channel, determine that the uplink transmission associated with the second downlink channel comes before the uplink transmission associated with the first downlink channel based on setting the operation for processing the downlink channels of the UE, and determine an error based on determining that the uplink transmission associated with the second downlink channel comes before the uplink transmission associated with the first downlink channel.

Another apparatus for wireless communication at a UE is described. The apparatus may include means for detecting first DCI over a first downlink channel at a first time, detecting second DCI over a second downlink channel at a second time after the first time, determining whether an uplink transmission associated with the second downlink channel comes before or after an uplink transmission associated with the first downlink channel, setting an operation for processing the downlink channels of the UE based on determining whether the uplink transmission associated with the second downlink channel comes before or after the uplink transmission associated with the first downlink channel, determining that the uplink transmission associated with the second downlink channel comes before the uplink transmission associated with the first downlink channel based on setting the operation for processing the downlink channels of the UE, and determining an error based on determining that the uplink transmission associated with the second downlink channel comes before the uplink transmission associated with the first downlink channel.

A non-transitory computer-readable medium storing code for wireless communication at a UE is described. The code may include instructions executable by a processor to detect first DCI over a first downlink channel at a first time, detect second DCI over a second downlink channel at a second time after the first time, determine whether an uplink transmission associated with the second downlink channel comes before or after an uplink transmission associated with the first downlink channel, set an operation for processing the downlink channels of the UE based on determining whether the uplink transmission associated with the second downlink channel comes before or after the uplink transmission associated with the first downlink channel, determine that the uplink transmission associated with the second downlink channel comes before the uplink transmission associated with the first downlink channel based on setting the operation for processing the downlink channels of the UE, and determine an error based on determining that the uplink transmission associated with the second downlink channel comes before the uplink transmission associated with the first downlink channel.

Some examples of the method, apparatuses, and non-transitory computer-readable medium described herein may further include operations, features, means, or instructions for detecting a third DCI over a third downlink channel at a fourth time after the second time, where determining that the uplink transmission associated with the second downlink channel comes before the uplink transmission associated with the first downlink channel may be based on detecting the third DCI.

Some examples of the method, apparatuses, and non-transitory computer-readable medium described herein may further include operations, features, means, or instructions for maintaining the operation for processing the downlink channels after detecting the third DCI associated with the third downlink channel, where determining the error may be based on maintaining the operation of the UE after detecting the third DCI.

Some examples of the method, apparatuses, and non-transitory computer-readable medium described herein may further include operations, features, means, or instructions for multiplexing the uplink transmission associated with the second downlink channel with an uplink transmission associated with the third downlink channel based on detecting the third DCI, where determining that the uplink transmission associated with the second downlink channel comes before the uplink transmission associated with the first downlink channel may be based on multiplexing the uplink transmission associated with the second downlink channel with the uplink transmission associated with the third downlink channel.

Some examples of the method, apparatuses, and non-transitory computer-readable medium described herein may further include operations, features, means, or instructions for determining that a priority of the second downlink channel changes from a first priority to a second priority greater than the first priority based on detecting the third DCI, where determining that the uplink transmission associated with the second downlink channel comes before the uplink transmission associated with the first downlink channel may be based on determining that the priority of the second downlink channel changes from the first priority to the second priority.

Some examples of the method, apparatuses, and non-transitory computer-readable medium described herein may further include operations, features, means, or instructions for reducing a speed of processing information associated with the second downlink channel based on determining that the uplink transmission associated with the second downlink channel comes before the uplink transmission associated with the first downlink channel.

In some examples of the method, apparatuses, and non-transitory computer-readable medium described herein, the operation for processing the downlink channels of the UE may be fixed after setting the operation.

Some examples of the method, apparatuses, and non-transitory computer-readable medium described herein may further include operations, features, means, or instructions for determining that a joint scheduling condition for processing the first downlink channel and the second downlink channel concurrently may be satisfied based on a processing capability of the UE, where the setting the operation may be based on the joint scheduling condition being satisfied.

Some examples of the method, apparatuses, and non-transitory computer-readable medium described herein may further include operations, features, means, or instructions for identifying a quantity of parameters associated with processing the first downlink channel and processing the second downlink channel, where determining that the joint scheduling condition may be satisfied may be based on identifying the quantity of parameters.

In some examples of the method, apparatuses, and non-transitory computer-readable medium described herein, the parameters include resource blocks, transport blocks, layers, or a combination thereof.

In some examples of the method, apparatuses, and non-transitory computer-readable medium described herein, the first downlink channel and the second downlink channel may be associated with an active bandwidth part of a serving cell.

In some examples of the method, apparatuses, and non-transitory computer-readable medium described herein, the first downlink channel and the second downlink channel may be on different serving cells.

In some examples of the method, apparatuses, and non-transitory computer-readable medium described herein, the first downlink channel and the second downlink channel may be on a same serving cell.

DETAILED DESCRIPTION

In some wireless communications systems, different communications may have different priorities. The different priorities between the different communications, may cause situations where a user equipment (UE) may be configured or scheduled to process channels out-of-order. For example, the UE may be configured to process a hybrid automatic repeat request (HARQ) acknowledgement (ACK) or negative acknowledgement (NACK) out-of-order. In another example, the UE may be configured to process uplink transmission after receiving scheduling grants out-of-order.

Techniques are described herein for performing out-of-order processing. The UE may receive information associated with a first downlink channel at a first time and information associated with a second channel at a second time. In some cases, the second channel may be a downlink channel or an uplink channel. The UE may determine that a priority of the second channel is different (e.g., higher) than a priority of the first downlink channel. In some cases, the UE may determine that a first uplink transmission associated with the first downlink channel is to be transmitted after a second uplink transmission (e.g., out-of-order) associated with the second channel based on the different priorities. The UE may set one or more operations based on these determinations. In some cases, the UE may suspend processing the of the first downlink channel to process the second channel.

In other cases, the UE 115 may determine that resources for a first transmission (e.g., time and frequency resources) overlap with resources for a second transmission. For example, the first transmission may overlap with a second transmission in a transmission slot. The UE 115 may suspend (e.g., drop) processing of the first downlink channel. The UE 115 may extend a minimum procedure timing associated with the second channel. In some cases, the minimum procedure timing may be referred to as a minimum preparation timing if the transmissions are uplink, or a minimum processing timing if the transmissions are downlink. The UE 115 may process the second channel according to the minimum procedure timing and the direction of transmission.

Aspects of the disclosure are described in the context of a wireless communications systems resource diagrams. Aspects of the disclosure are further illustrated by and described with reference to apparatus diagrams, system diagrams, and flowcharts that relate to out-of-order processing.

Figure 1:
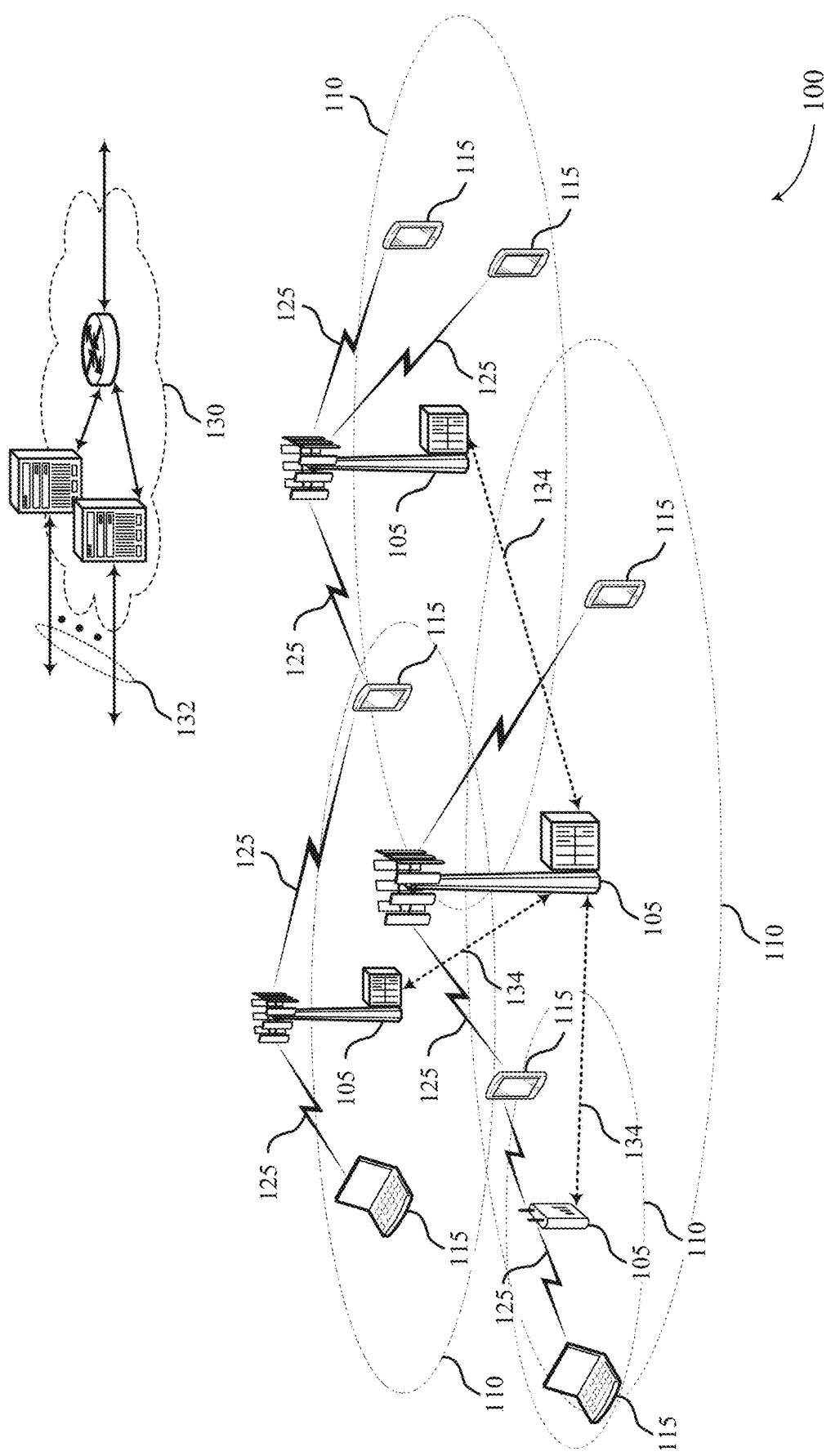
FIG. 1 illustrates an example of a system for wireless communications at a user equipment (UE) that supports out-of-order processing in accordance with aspects of the present disclosure.

FIG. 1 illustrates an example of a wireless communications system 100 that supports out-of-order processing in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying an amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Techniques are described herein for performing out-of-order processing. The UE 115 may receive a first downlink channel at a first time and a second channel at a second time. UE 115-a may determine that a priority of the second channel is higher than a priority of the first downlink channel. For example, the UE 115 may receive a preempting grant from a base station that may grant the second channel a higher priority than the first channel. In some cases, the UE 115 may determine that a first uplink transmission associated with the first downlink channel is to be transmitted after a second uplink transmission (e.g., out-of-order) associated with the second uplink transmission based on the different priorities. The UE 115 may set one or more operations based on these determinations. The UE 115 may suspend (e.g., drop) processing of the first downlink channel to process the second channel.

In some cases, the UE 115 may determine that resources for a first transmission (e.g., time and frequency resources) overlap with resources for a second transmission. For example, the first transmission may overlap with a second transmission in a transmission slot. The UE 115 may suspend (e.g., drop) processing of the first downlink channel based on the overlap. The UE 115 may extend a minimum procedure timing associated with the second channel based on the overlap. In some cases, the minimum procedure timing may be referred to as a minimum preparation timing if the transmissions are uplink, or a minimum processing timing if the transmissions are downlink. The UE 115 may process the second channel according to the minimum procedure timing and the direction of transmission.

Figure 2:
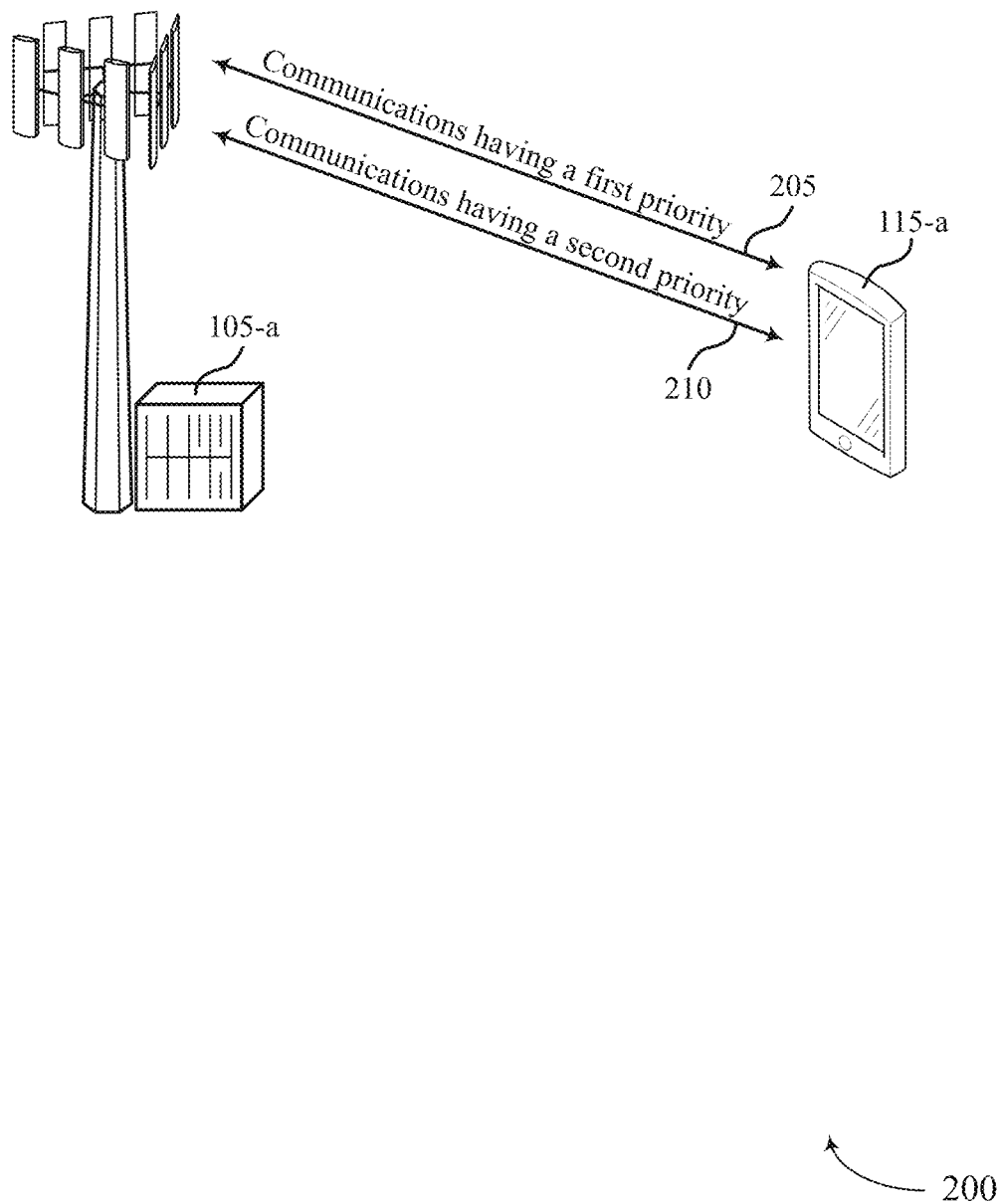
FIG. 2 illustrates an example of a wireless communications system that supports out-of-order processing in accordance with aspects of the present disclosure.

FIG. 2 illustrates an example of a wireless communications system 200 that supports out-of-order processing in accordance with aspects of the present disclosure. In some examples, the wireless communications system 200 may implement aspects of wireless communications system 100. The wireless communications system 200 may include one or more base stations 105-a and one or more UEs 115-a. The base stations 105-a may be examples of the base stations 105 described with reference to FIG. 1. The UEs 115-a may be examples of the UEs 115 described with reference to FIG. 1.

The wireless communications system 200 illustrates possible implementations of out-of-order processing. The wireless communications system 200 may support communications having different priorities. For example, base station 105-a and UE 115-a may exchange communications 205 having a first priority and communications 210 having a second priority. When base station 105-a or UE 115-a receive communications of a higher priority while processing a lower priority communication, base station 105-a or UE 115-a may perform out-of-order processing to handle the communication with the higher priority.

In some cases, UE 115-a may suspend (e.g., drop or stop without resuming) processing of a lower priority channel under some conditions. Examples of these conditions may include a joint scheduling condition described herein. The behavior of a UE 115 may be determined, or fixed, after decoding the downlink channel (e.g., a physical downlink control channel (PDCCH)) associated with the lower priority and a channel (e.g., PDCCH, physical uplink shared channel (PUSCH), or physical uplink control channel (PUCCH)) associated with the higher priority. In some cases, the first information may include DCI, a configure grant associated with a PUSCH, a low priority scheduling request (SR) associated with a PUCCH, or a periodic channel state information (CSI) associated with a PUCCH. UE 115-a may suspend (e.g., drop) its processing of the information associated with the lower priority channel after determining that processing the downlink channel associated with the lower priority and processing the downlink channel associated with the higher priority will not satisfy scheduling limitations. UE 115-a may suspend its processing of the information associated with the lower priority channel if the transmission resources (e.g., time and frequency) of the lower priority channel overlap with the transmission resources of the higher priority channel.

In some cases, if the scheduling limitations for a UE 115 are not satisfied or the UE detects the control channel (e.g., PDCCH or PUCCH) of a higher priority channel (e.g., PDSCH or PUSCH) or both, the UE 115 may stop processing information the lower priority downlink channel (e.g., PDSCH). For example, for a high priority channel (e.g., PUSCH or PDSCH), the behavior of UE 115-a may include at least the processing timing capability, and whether UE 115-a processes both channels or drops the processing of the lower priority channel. In some cases, the change of behavior for the UE 115 may be due to triggering other channels on the same serving cell or different serving cells. The change of behavior may be identified as an error case by UE 115-a. In some cases, when the scheduling condition is not satisfied, UE 115-a may extend the minimum procedure time of the second channel by a quantity of symbols (e.g., an offset).

Additionally or alternatively, the UE 115 may determine that transmission resources for a higher priority channel (e.g., time and frequency resources) overlap with a lower priority channel. The UE 115 may suspend (e.g., drop) processing of the first downlink channel. The UE 115 may extend a minimum procedure timing associated with the second channel. In some cases, the minimum procedure timing may include a minimum preparation timing if the transmissions are uplink, or a minimum processing timing if the transmissions are downlink. The UE 115 may process the second channel according to the minimum procedure timing and the direction of transmission.

In some examples, multiple downlink channels and multiple uplink channels (e.g., PDSCH1, PDSCH2, PDSCH3 and PUCCH1, PUCCH2, PUCCH3) may be out-of-order (e.g., at least some if not all of them may be nested). In these cases, decisions related to out-of-order processing may be made sequentially. That is, when the UE115-a decodes a PDCCH associated with PDSCH2, UE 115-a may decide on one or more operations or behaviors (e.g., whether to drop PDSCH1 or not). When UE 115-a decodes a PDCCH associated with PDSCH3, UE 115-a may decide on one or more operations or behaviors (e.g., whether to drop PDSCH2 or not). UE 115-a may not know in advance whether PDSCH3 decoding will lead to dropping PDSCH2, so the UE may not drop PDSCH1 due to processing PDSCH2. Thus, UE 115-a may be configured in a manner to execute decisions related to out-of-order processing in a sequential manner.

In some examples, in the context of downlink communication, UE 115-a may not expect a resource (e.g., a PUCCH resource) to be pulled into the time domain, for example, after one or more operations or conditions (e.g., multiplexing). In some cases, UE 115-a may process both the lower priority and higher priority channels according to scheduling conditions, which may be set as a UE capability. Such conditions may apply to both the lower priority and the higher priority channels. The scheduling conditions may include a quantity of component carriers, a quantity of resource blocks, a quantity of transport blocks, a size of transport blocks, a quantity of layers, or combinations thereof. In some cases, UE 115-a may not expect the scheduling conditions to be violated. When the conditions are not met, UE 115-a may detect an error event.

In some examples, UE 115-a may support a set bandwidth (e.g., 100 MHz). The UE 115-a may indicate a capability, for example, supporting lower priority traffic with a first subset of the bandwidth (e.g., 50 MHz) and higher priority traffic with a second subset of the bandwidth (e.g., 50 MHz). When out-of-order scheduling or transmissions occur, as described herein, if the lower priority channel and higher priority channel allocations are consistent with the capability, then UE 115-a may be configured to support out-of-order scheduling. Otherwise, UE 115-a may detect an error case (e.g., if the lower priority channel and higher priority channel allocations are inconsistent with the capability, then the UE may not be configured to support out-of-order scheduling).

In some cases, a device, such as UE 115-a may signal one or more capabilities. For example, UE 115-a may perform capability signaling associated with downlink communication, uplink communication, or both. In one example, the capability signaling for downlink communication may be identified and/or performed separate from the capability signaling for uplink communication. In other examples, one or more UE capability values may be predetermined (e.g., specified).

In some cases, a UE 115 may support out-of-order operations in a variety of conditions. For example, UE 115-a (e.g., an eURLLC UE) may send, on the active bandwidth part (BWP) of a given serving cell, the HARQ ACK associated with the second channel with a first HARQ process ID received after the first channel with a second HARQ process ID (where the first HARQ process ID is different than the second HARQ process ID) before the HARQ ACK of the first channel. In other examples, on the active BWP of a given serving cell, UE 115-*a* may be scheduled with a second channel (e.g., PUSCH) associated with a first HARQ process starting earlier than the ending symbol of the first channel (e.g., PUSCH) associated with a second HARQ process (where the first HARQ process is different than the second HARQ process) with a channel (e.g., PDCCH) that does not end earlier than the ending symbol of first scheduling channel (e.g., PDCCH).

Figure 3:
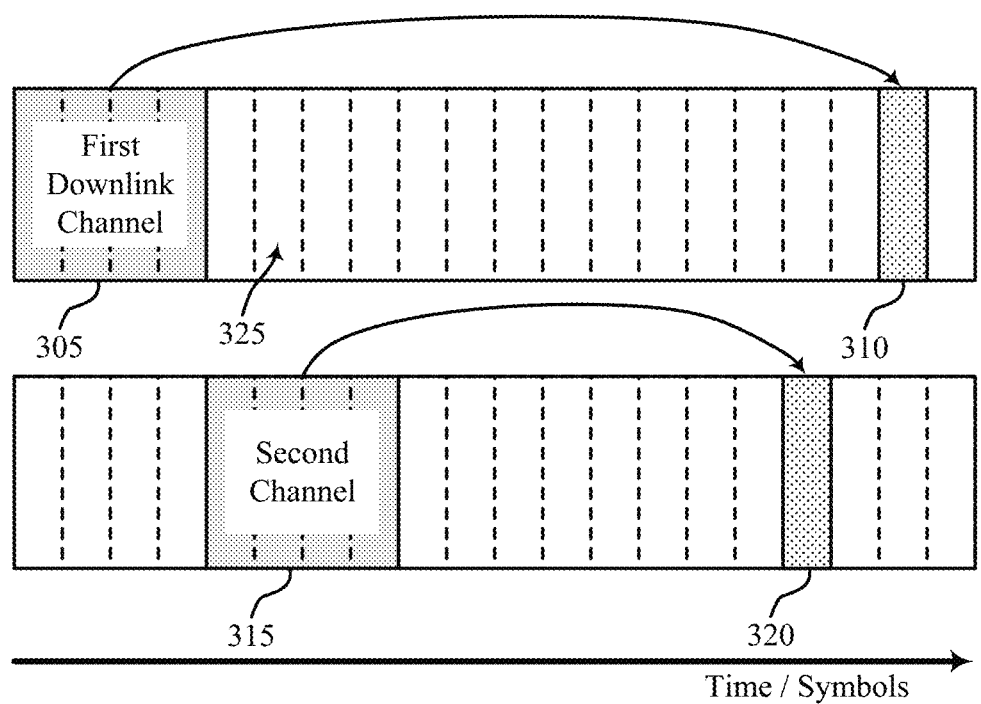
FIG. 3 illustrates an example of a resource diagram that supports out-of-order processing in accordance with aspects of the present disclosure.

FIG. 3 illustrates an example of a resource diagram 300 that supports out-of-order processing in accordance with aspects of the present disclosure. In some examples, the resource diagram 300 may implement aspects of wireless communications systems 100 and 200. The resource diagram 300 shows two channels that implicate out-of-order processing.

The resource diagram 300 includes a first downlink channel 305, a first transmission 310 associated with the first downlink channel 305, a second channel 315, and a second transmission 320 associated with the second channel 315. In some cases, the first transmission 310 may be an uplink transmission. Additionally, the second channel 315 may be a downlink channel or uplink channel, and may correspond to an uplink or downlink transmission 320. The resource diagram 300 shows a plurality of symbols 325 used for communicating via the channels 305 and 315 and the transmissions 310 and 320. A transmission timing may include a quantity of symbols between receiving a channel and transmitting its associated transmission. A UE 115 may determine the first downlink channel 305 and the second channel 315 have different priorities, and the UE 115 may be configured to use out-of-order processing in such situations. The UE 115-*a* may be configured to determine whether out-of-order processing may be used.

The second channel 315 may be associated with a higher priority operation. In some cases, the priority level of the channel may be based on a timing (e.g., a transmission timing) between the channel and its associated transmission. In some cases, the priority level of the channel may be indicated at the physical (PHY) layer. In some examples, the PHY layer signaling may include a field associated with the DCI, DCI size/format, control resource set (CORESET), search space set, radio network temporary identifier (RNTI), or combinations thereof that indicates the priority of the channel.

The UE 115 may determine whether the second channel 315 is to be processed out-of-order relative to the first downlink channel 305. UE 115-*a* may make such a determination after receiving the second channel 315. In some cases, UE 115-*a* may make the determination that the second channel 315 is to be processed out-of-order based on the priorities of the two channels. The UE 115 may identify that a second priority of the second channel 315 is greater than a first priority of the first downlink channel 305 based at least in part on detecting information corresponding to the channels. For example, the first downlink channel 305 may correspond to first information such as DCI, a configure grant associated with a PUSCH, a low priority scheduling request (SR) associated with a PUCCH, or a periodic CSI associated with a PUCCH. The second channel 310 may correspond to DCI. In some cases, the UE 115 may identify the priorities based on one or more fields in the DCIs, in PHY layer signaling, or a combination thereof. In some cases, the UE 115 may identify the priorities by identifying uplink timings associated each downlink channel.

In some cases, after making the determination that the second channel 315 is to be processed out-of-order, the UE 115 may set the operation for processing both the first downlink channel 305 and the second channel 315. Examples of the operations the UE 115 may select may include suspending (e.g., dropping) processing of the first downlink channel 305, processing both the first downlink channel 305 and the second channel 315 concurrently, identifying the processing as an error case, or a combination thereof. It may be challenging to change operations, or processing regimes, after the UE 115 sets the operation. Thus, in some cases, the behavior of the UE 115 may be static or fixed after setting the operation (e.g., the UE 115 may not change the priority of the first downlink channel 305 other than dropping it after setting the operation). In some cases, the UE 115 may decode a control channel (e.g., PDCCH) associated with the second channel 315, and use the control channel to determine whether to perform out-of-order processing.

The UE 115 may determine whether the UE 115-*a* is capable of processing both channels concurrently. To accomplish this, the UE 115 may compare a quantity of parameters associated with processing the first downlink channel 305 and the second channel 315 and the processing capabilities of the UE 115. Examples of the parameters may include component carriers, resource blocks, transport blocks, layers, or combinations thereof. If the quantity of resource blocks (or other parameter) exceeds the processing capability of the UE 115, the UE 115 may suspend (e.g., drop) processing the lower priority downlink channel (e.g., the first downlink channel 305) or may identify an error case. If the quantity of resource blocks (or other parameter) fails to satisfy the processing capability of the UE 115, the UE 115 may process both channels concurrently. When the UE 115 selects a channel to suspend, the UE 115 may not resume processing of the channel (e.g., due to discarding materials associated with the selected channel).

In some cases, the UE 115 may be capable of processing both channels concurrently by determining whether a joint scheduling condition is satisfied. The UE 115 may identify a first quantity of parameters (e.g., resource blocks, transport blocks, layers) associated with the first downlink channel 305, identify a second quantity of parameters (e.g., resource blocks, transport blocks, layers) associated with the second channel 315, and sum the first quantity and the second quantity. If the sum of the first quantity and the second quantity exceeds a processing threshold of the UE 115, the UE 115 may determine the joint scheduling condition is not satisfied. In some examples, the joint scheduling condition may be defined across multiple channels (e.g., two channels). In other examples, the joint scheduling condition may be defined for each channel. If the joint scheduling condition is separately defined, and if one is not met or satisfied for a channel, the UE 115 may determine how to operate (e.g., may determine to drop or may determine that an error occurred). If the joint scheduling is not satisfied, the UE 115 may suspend (e.g., drop, cease without resuming) processing the lower priority channel (e.g., the first downlink channel 305) or may identify an error case. If the joint scheduling condition is satisfied, the UE 115 may process both channels concurrently.

The UE 115 may determine to suspend the processing of the first downlink channel 305. In some cases, the processing of the first downlink channel 305 may not be allowed to be stopped because of the priority of the first downlink channel 305, how close the first downlink channel 305 is to completing the processing, or other factors. In some cases, the processing capability of the UE 115 may be referred to as a processing timing capability. In some cases, the processing of the channel with the lower priority may be suspended when the channels are on the same serving cell. In some cases, the processing of the channel with the lower priority may be suspended when the channels are on different serving cells. In some cases, UE 115 may select the lower priority channel and the serving cell.

When suspending (e.g., dropping) processing of the first channel, it may take some time to completely suspend (e.g., drop) the first downlink channel 305. To account for this delay, the UE 115 may extend a procedure timing associated with the second channel 315. The first downlink channel 305 and second channel 315 may have an associated preparation timing or minimum processing timing based on the transmission direction. For example, the minimum procedure timing may include a minimum preparation timing if the transmissions are uplink, or a minimum processing timing if the transmissions are downlink. The procedure timing may be associated with the priority of the channel. The procedure timing (e.g., processing timing) may be or relate to the UE 115 channel (e.g., PDSCH) processing procedure time (e.g., N1). In some cases, there may be a capability 1 and capability 2 for N1 (e.g., different N1 values based on the capability). The procedure timing (e.g., processing timing) may be or relate to the UE 115 PUSCH preparation procedure time (e.g., N2). In some cases, there may be a capability 1 and capability 2 for N2, where each may have different N2 values per subcarrier spacing (SCS).

For example, channels that have a higher priority may have a shorter procedure timing than channels that have a higher priority. The UE 115 may identify an offset for the procedure timing of the second channel 315. The UE 115 may determine whether timing (e.g., downlink timing) that includes the procedure timing and the offset satisfies a condition associated with the priority of the second channel 315. If the timing satisfies the condition, the UE 115 may extend the procedure timing by the offset. If the timing fails to satisfy the condition, the UE 115 may identify an error case because the second channel 315 may not be processed, even if the processing of the first downlink channel 305 is suspended. In some examples, the offset may be dependent on one or more conditions. For example, the offset may be dependent on, or related to, a UE capability, the SCS, a timing capability of a first channel, a timing capability of a second channel, other conditions, or any combination thereof. Additionally, in some examples, a first offset for downlink communication may be different than and/or may be chosen differently compared to a second offset for uplink communication. For example, the determination of a first offset for downlink communication may be based on one or more first factors while the determination of a second offset for uplink communication may be based on one or more second factors, where at least some if not all of the first factors may be different than at least some if not all of the second factors.

In some examples, the UE 115 may use at least N1 symbols between the end of a downlink channel (e.g., PDSCH) and the beginning of an uplink channel (e.g., PUCCH). In some examples related to out-of-order processing, the gap (e.g., the minimum gap) between the end of a PDSCH and a beginning of a PUCCH should be N1+ an adjustment or offset (e.g., delta). In this case, a device, such as a base station 105, may determine that and/or set the gap between the PDSCH and the PUCCH to be at least the adjusted or offset amount (e.g., N1+ an adjustment or offset). Similar conditions may occur for uplink transmissions. In other examples, the gap (e.g., the minimum gap) between the end of a PDCCH and the beginning of a PUSCH should be N2+ an adjustment or offset (e.g., delta). In this case, a device, such as the base station 105, may determine that and/or set the gap between the PDCCH and the PUSCH to be at least the adjusted or offset amount (e.g., N2+ an adjustment or offset). In some examples, a device, such as the UE 115, may identify (e.g., choose, report, set) a first offset for a first processing timing associated with downlink communication, and/or identify (e.g., choose, report, set) a second offset for a second preparation timing associated with uplink communication separate from identifying the first offset for the first processing timing associated with the downlink communication.

The UE 115 may identify a trigger event associated with a third channel after setting the operation for processing the first and second channels of the UE 115. Because the operation is fixed after it is set, the UE 115 may maintain a priority of the first downlink channel based at least in part on identifying the trigger event or may maintain the operation set previously based at least in part on identifying the trigger event. In some cases, the trigger event may include detecting third information associated with the third channel. The third information may be an example of the first information or second DCI. In some cases, a priority of the first downlink channel is unchanged after setting the operation for processing the channels of the UE 115. In some cases, extending the procedure timing is based at least in part on determining whether the joint scheduling condition is satisfied.

In some cases, the UE 115 may perform one or more operations after determining the transmissions 310 and 320 may collide. In some cases, the collision handling operations may be based on the priorities of the channels 305 and 315. In some cases, the UE 115 may determine a likelihood that the uplink transmissions 310 and 320 may collide, or may determine that the transmissions 310 and 320 may collide. Based on that determination, the UE 115 may initiate one or more collision handing operations. In some examples, a collision handling operation may include multiplexing the first transmission 310 with the second transmission 320.

One example of a scenario where out-of-order processing may occur may include communicating HARQ-ACKs or HARQ-NACK for the related physical downlink shared channels (PDSCHs). In such an example, the channels 305 and 315 may be downlink channels, and may be examples of PDSCHs or PDSCH transmissions and the transmissions 310 and 320 may be examples of HARQ-ACKs or HARQ-NACKs. The HARQ-ACKs or HARQ-NACKs may be communicated over one or more physical uplink control channels (PUCCHs). The UE 115 may be scheduled with a second PDSCH with a second HARQ process ID received after the first PDSCH with a second HARQ process ID different than first HARQ process ID. In such cases, the UE 115 may provide the HARQ-ACKs/NACKs for the second PDSCH before the HARQ ACKs/NACKs for the first PDSCH. The first PDSCH and the first HARQ-ACKs/NACKs may be associated with a first HARQ process ID and the second PDSCH and the second HARQ-ACKs/NACKs may be associated with a second HARQ process ID different than the first HARQ process ID. The UE 115 may determine out-of-order processing operations based at least in part on the HARQ process IDs being different. In some cases of this example, the PDSCHs or HARQ-ACKs may be on a same serving cell. In some cases, the PDSCHs or HARQ-ACKs may be on an active BWP of the serving cell.

In some cases of this example, the PDSCHs or HARQ-ACKs may be on different serving cells.

One example of a scenario where out-of-order processing may occur may include communicating PUSCHs for the related PDCCHs. In such an example, channels 305 and 315 may be examples of PDCCHs, PDCCH transmission, grant messages, or combination thereof and the transmissions 310 and 320 may be examples of PUSCHs or PUSCH transmission. The UE 115 may receive a second PDCCH (e.g., channel 315) after receiving the first PDCCH (e.g., downlink channel 305), but the UE 115 may be scheduled to transmit the second PUSCH (e.g., transmission 320) associated with the second PDCCH (e.g., channel 315) before transmitting the first PUSCH (e.g., transmission 310). The first PDCCH and the first PUSCH may be associated with a first HARQ process ID and the second PDCCH and the second PUSCH may be associated with a second HARQ process ID different than the first HARQ process ID. The UE 115 may determine out-of-order processing operations based at least in part on the HARQ process IDs being different. In some cases, the second PDCCH that may not end earlier than the ending symbol of first PDCCH. In some cases, the PDCCHs or PUSCHs may be on a same serving cell. In some cases, the PDCCHs or PUSCHs may be on an active BWP of the serving cell. In some cases of this example, the PDCCHs or PUSCHs may be on different serving cells.

The UE 115 may identify that a HARQ process identifier associated with the first downlink channel 305 is different than a HARQ process identifier associated with the second channel 315. In some examples, for any two HARQ process identifiers in a given scheduled cell, the UE 115 may not expect to receive two downlink channels with uplinks timings that are out-of-order. In such examples, a base station 105 may be configured to schedule the downlink channels to meet this condition. In some cases, for any two HARQ process IDs in a given scheduled cell, UE 115-a may not expect to receive two PDSCHs with PDSCH-to-HARQ timing compatible with PDSCH processing time for a given capability to be out of order. In some cases, for any two HARQ process IDs in a given scheduled cell, the UE 115 may not expect to receive two PUSCHs with PDCCH-to- timing compatible with PUSCH procedure timing for a given capability to be out of order.

Figure 4:
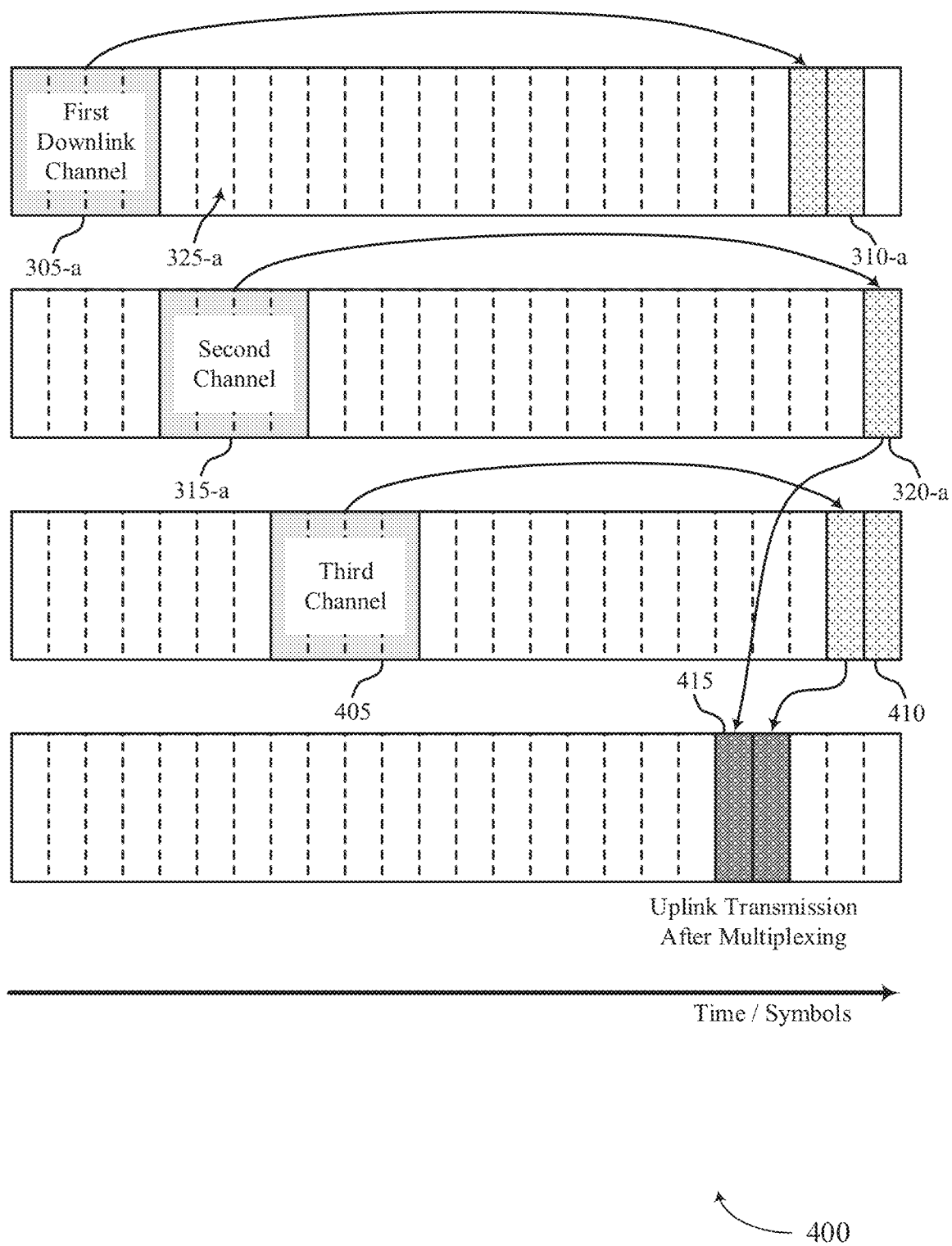
FIG. 4 illustrates an example of a resource diagram that supports out-of-order processing in accordance with aspects of the present disclosure.

FIG. 4 illustrates an example of a resource diagram 400 that supports out-of-order processing in accordance with aspects of the present disclosure. In some examples, the resource diagram 400 may implement aspects of wireless communications systems 100 and 200.

The resource diagram 400 illustrates a scenario where UE 115-a receives a third downlink channel 405, UE 115-a is scheduled to transmit a third uplink transmission 410, and operations UE 115-a may perform in out-of-order processing scenarios. The resource diagram includes the first downlink channel 305-a, the first uplink transmission 310-a, the second downlink channel 315-a, the second uplink transmission 320-a, and the plurality of symbols 325-a. The features and operations described with reference to FIG. 3 also apply to the features and operations described with reference to FIG. 4.

UE 115-a may set an operation for processing the first downlink channel 305-a after receiving the second downlink channel 315-a. In some cases, UE 115-a may receive the third downlink channel 405. Receipt of the third downlink channel 405 may cause timing associated with the uplink transmission 320-a to change. For example, UE 115-a may determine that the uplink transmission 410 collides with the uplink transmission 320-a. UE 115-a may multiplex the uplink transmission 410 with the uplink transmission 320-a based on this determination to form an uplink transmission 415. Due to the multiplexing (e.g., uplink control information multiplexing), the resulting uplink transmission 415 (which may include the uplink transmission 320-a and the uplink transmission 410) may jump ahead of the uplink transmission 310-a. Thus, the uplink transmission 320-a may change from being in-order with the uplink transmission 310-a to being out-of-order with the uplink transmission 310-a.

Such a situation may cause some problems for UE 115-a processing. For example, after receiving the second downlink channel 315-a, UE 115-a may determine to process the first downlink channel 305-a at a speed (e.g., slow) or may decide to suspend (e.g., drop) processing of the first downlink channel 305-a. Later, after receiving the third downlink channel 405, UE 115-a may want to speed up the processing for the first downlink channel 305-a or may want to restart the processing for the first downlink channel 305-a. For example, this may relate to a second downlink channel associated with UE 115-a. Originally, its processing procedure time (e.g., N1) may be compatible with the capability 1 timing. After multiplexing or another operation, however, its processing procedure time may be compatible with capability 2 timing, where the capability 2 timing may be shorter than the original capability 1 timing. This will essentially mean that the UE should suddenly act faster.

In some cases, the UE's behavior after detecting the second downlink channel 315-a may be fixed. When conditions change like this after receiving the third downlink channel 405, UE 115-a may determine that not perform any actions and may not send any indication of the error case to the base station 105.

In some cases, the UE's PDSCH-to-HARQ gap that is compatible with capability 1 timing at the time of PDCCH detection may not be shortened below the minimum needed for capability 1 timing (i.e., become compatible to capability 2 timing). In some cases, UE 115-a may be configured to lengthen a PDSCH-to-HARQ gap that is compatible with capability 2 timing to be above the threshold for capability 1 timing. For example, after PDCCH detection, if UE 115-a determines that the first downlink channel 305 should be suspended, later, when the timing becomes compatible with a slower timing capability, such a decision may not be changed.

In some examples, when two PUSCHs are overlapping on the same cell (e.g., in the time domain), only one of the PUSCHs may be sent. In this case, UE 115-a may drop the processing of one PUSCH (e.g., a first PUSCH having a lower priority than the second PUSCH). In some cases, this dropping may occur without any scheduling condition being imposed (e.g., because sending two simultaneous PUSCHs on the same cell is not possible).

Figure 5:
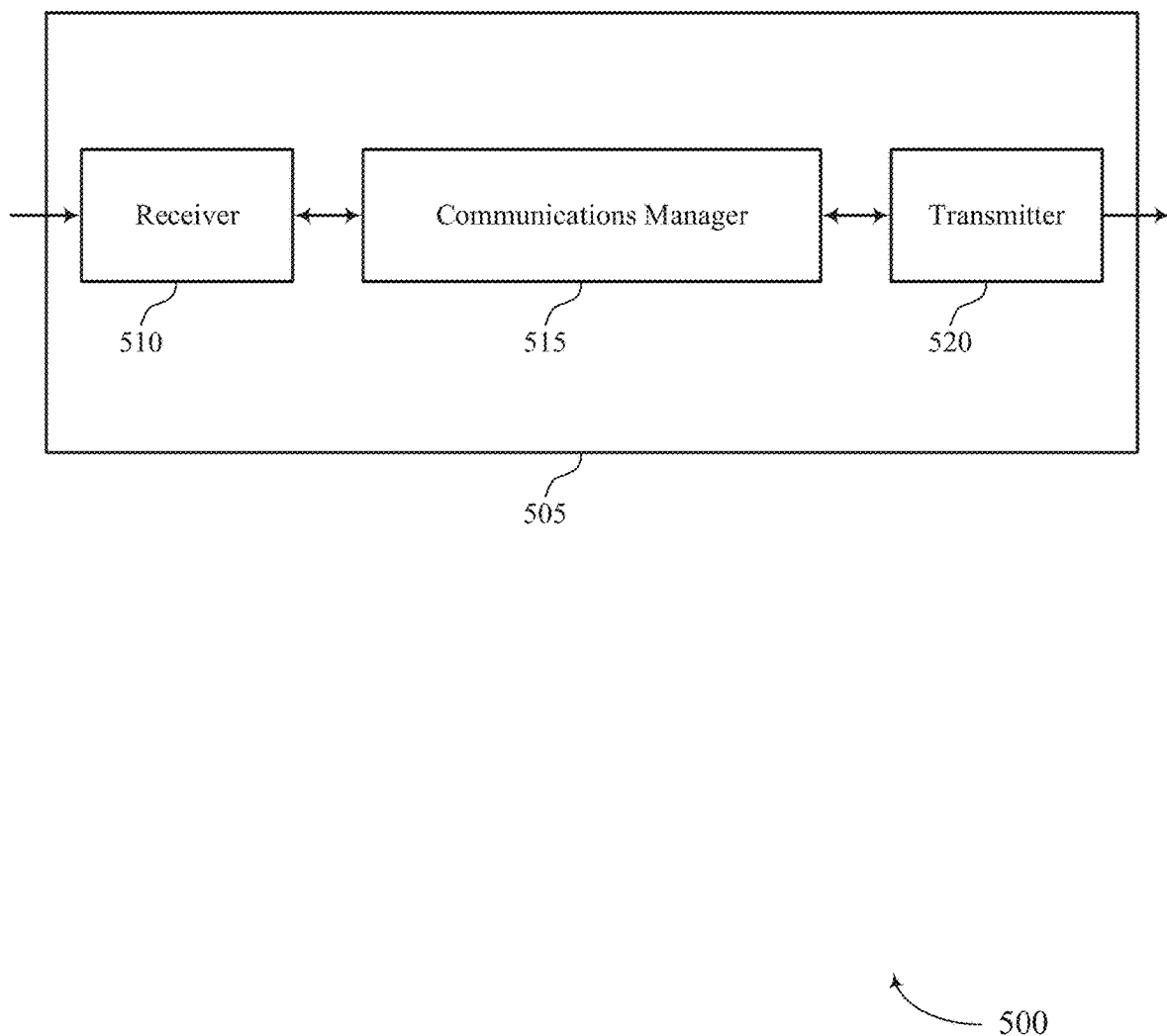
FIGS. 5 and 6 show block diagrams of devices that support out-of-order processing in accordance with aspects of the present disclosure.

FIG. 5 shows a block diagram 500 of a device 505 that supports out-of-order processing in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to out-of-order processing, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may detect first information over a first downlink channel at a first time, detect DCI associated with a second channel at a second time after the first time, determine that transmission resources of the first downlink channel overlap in time with transmission resources of the second channel, suspend processing information associated with the first downlink channel based on determining that the transmission resources overlap, extend a minimum procedure timing associated with the second channel based on suspending processing the information associated with the first downlink channel, and process the second channel based on extending the minimum procedure timing.

The communications manager 515 may also detect first information over a first downlink channel at a first time, detect DCI over a second channel at a second time after the first time, determine whether an uplink transmission associated with the second channel comes before or after an uplink transmission associated with the first downlink channel, determine that the uplink transmission associated with the second channel comes before the uplink transmission associated with the first downlink channel based on setting the operation for processing the channels of the UE, set an operation for processing the channels of the UE based on determining whether the uplink transmission associated with the second channel comes before or after the uplink transmission associated with the first downlink channel, and determine an error based on determining that the uplink transmission associated with the second channel comes before the uplink transmission associated with the first downlink channel. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
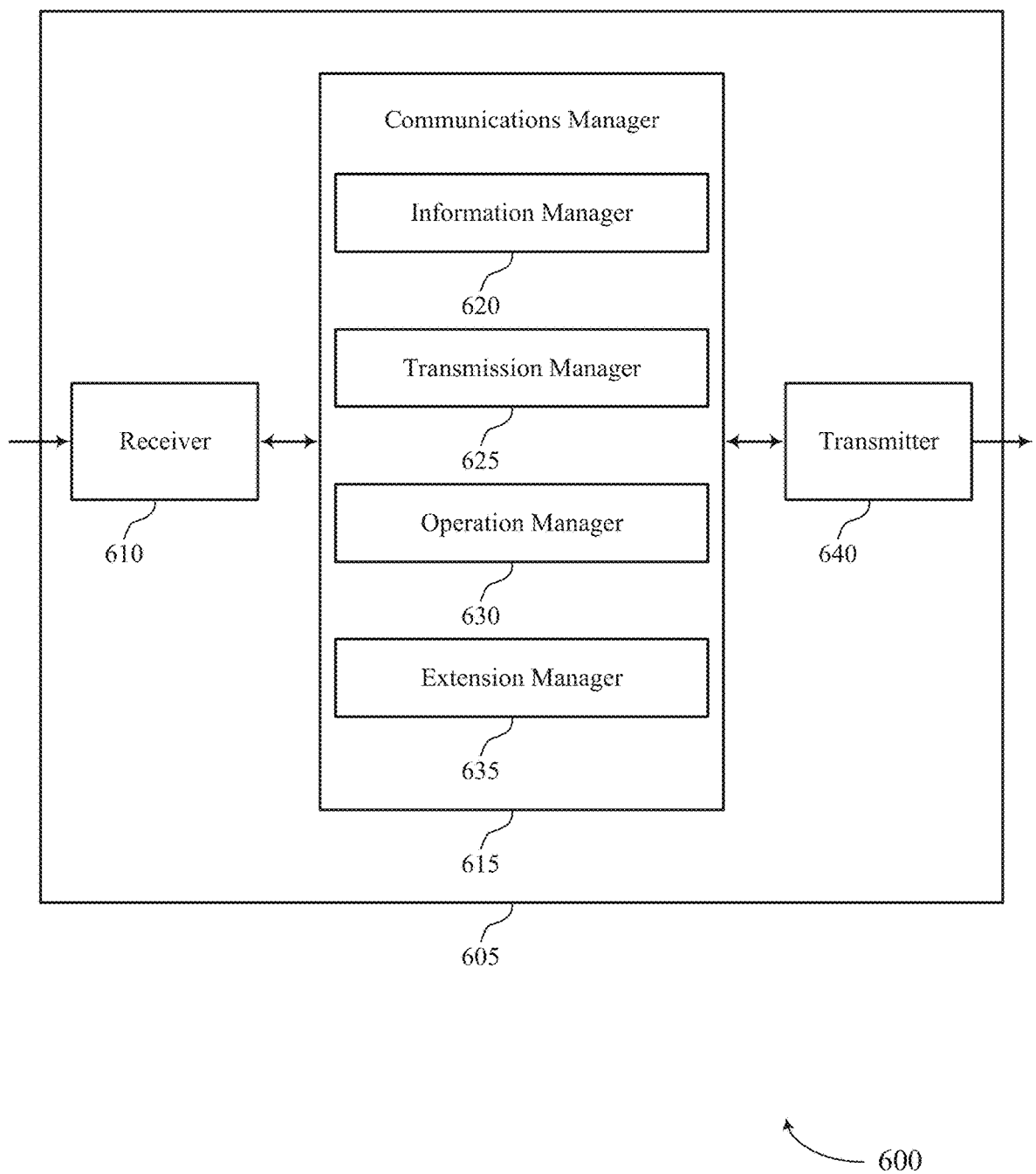

FIG. 6 shows a block diagram 600 of a device 605 that supports out-of-order processing in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to out-of-order processing, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an information manager 620, a transmission manager 625, an operation manager 630, and an extension manager 635. The communications manager 615 may be an example of aspects of the communications manager 810 described herein.

The actions performed by the communications manager 515 as described herein may be implemented to realize one or more potential advantages. One implementation may enable a base station to transmit an SRS configuration message that indicates reference signals from one or more TRPs to a UE. Such indications may enable techniques for determining an SRS transmission beam at the UE, which may result in higher data rates and more efficient communications (e.g., less communication errors), among other advantages.

Based on implementing the indications as described herein, a processor of a UE or base station (e.g., a processor controlling the receiver 510, the communications manager 515, the transmitter 520, or a combination thereof) may reduce the impact or likelihood of interference in a communications system while ensuring relatively efficient communications. For example, the reporting techniques described herein may leverage a relationship between the reference signals as well as the transmission beam determination procedure, which may realize reduced signaling overhead and power savings, among other benefits.

The information manager 620 may detect first information over a first downlink channel at a first time and detect DCI associated with a second channel at a second time after the first time. The transmission manager 625 may determine that transmission resources of the first downlink channel overlap in time with transmission resources of the second channel. The operation manager 630 may suspend processing information associated with the first downlink channel based on determining that the transmission resources overlap. The extension manager 635 may extend a minimum procedure timing associated with the second channel based on suspending processing the information associated with the first downlink channel and process the second channel based on extending the minimum procedure timing. The information manager 620 may detect first information over a first downlink channel at a first time and detect DCI over a second channel at a second time after the first time.

The transmission manager 625 may determine whether an uplink transmission associated with the second channel comes before or after an uplink transmission associated with the first downlink channel and determine that the uplink transmission associated with the second channel comes before the uplink transmission associated with the first downlink channel based on setting the operation for processing the channels of the UE.

The operation manager 630 may set an operation for processing the channels of the UE based on determining whether the uplink transmission associated with the second channel comes before or after the uplink transmission associated with the first downlink channel and determine an error based on determining that the uplink transmission associated with the second channel comes before the uplink transmission associated with the first downlink channel.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
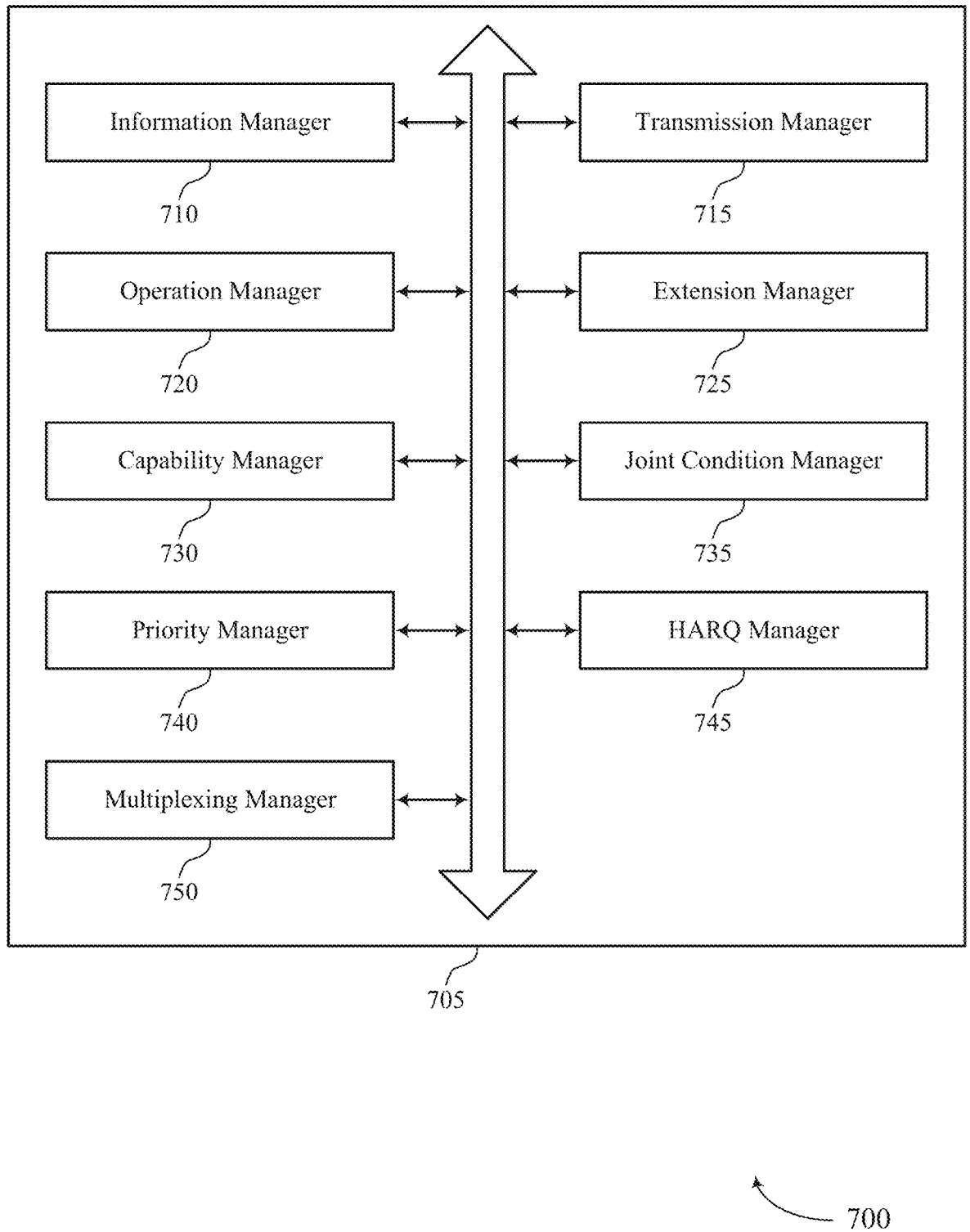
FIG. 7 shows a block diagram of a communications manager that supports out-of-order processing in accordance with aspects of the present disclosure.

FIG. 7 shows a block diagram 700 of a communications manager 705 that supports out-of-order processing in accordance with aspects of the present disclosure. The communications manager 705 may be an example of aspects of a communications manager 515, a communications manager 615, or a communications manager 810 described herein. The communications manager 705 may include an information manager 710, a transmission manager 715, an operation manager 720, an extension manager 725, a capability manager 730, a joint condition manager 735, a priority manager 740, a HARQ manager 745, and a multiplexing manager 750. Each of these modules may communicate, directly or indirectly, with one another (e.g., via one or more buses).

The information manager 710 may detect first information over a first downlink channel at a first time. In some examples, the information manager 710 may detect DCI associated with a second channel at a second time after the first time. In some cases, the information manager 710 may detect first information over a first downlink channel at a first time, and the information manager 710 may detect DCI over a second channel at a second time after the first time.

In some examples, the information manager 710 may detect a second DCI over a third channel at a fourth time after the second time, where determining that the uplink transmission associated with the second channel comes before the uplink transmission associated with the first downlink channel is based on detecting the second DCI. In some cases, the second channel includes a downlink channel. In other cases, the second channel is an uplink channel. In some cases, the first downlink channel includes a first PDSCH and the second channel includes a second PDSCH. The uplink transmission associated with the first downlink channel includes a HARQ ACK or a HARQ NACK and the uplink transmission associated with the second channel includes a HARQ ACK or a HARQ NACK. In some cases, the HARQ ACK or the HARQ NACK is transmitted over a PUCCH. In some cases, the first downlink channel includes a first PDCCH and the second channel includes a second PDCCH. In some cases, the uplink transmission associated with the first downlink channel includes a first PUSCH transmission and the uplink transmission associated with the second channel includes a second PUSCH.

In some cases, the first downlink channel and the second channel are associated with an active bandwidth part of a serving cell. In some cases, the first downlink channel and the second channel are associated with different serving cells. In some cases, the first downlink channel and the second channel are associated with a same serving cell. In some cases, the first downlink channel and the second channel are associated with an active bandwidth part of a serving cell.

The transmission manager 715 may determine that transmission resources of the first downlink channel overlap in time with transmission resources of the second channel. In some examples, the transmission manager 715 may determine whether an uplink transmission associated with the second channel comes before or after an uplink transmission associated with the first downlink channel. In some examples, the transmission manager 715 may determine that the uplink transmission associated with the second channel comes before the uplink transmission associated with the first downlink channel based on setting the operation for processing the channels of the UE.

The operation manager 720 may suspend processing information associated with the first downlink channel based on determining that the transmission resources overlap. In some examples, the operation manager 720 may set an operation for processing the channels of the UE based on determining whether the uplink transmission associated with the second channel comes before or after the uplink transmission associated with the first downlink channel. In some examples, the operation manager 720 may determine an error based on determining that the uplink transmission associated with the second channel comes before the uplink transmission associated with the first downlink channel.

In some examples, the operation manager 720 may set an operation for processing the downlink channels of the UE based on determining that there is the overlap of the first downlink channel and the second channel, where suspending processing of the information is based on setting the operation for processing. In some examples, the operation manager 720 may identify a trigger event associated with a third channel after setting the operation for processing the channels of the UE. In some examples, the operation manager 720 may maintain a priority of the first downlink channel based on identifying the trigger event. In some examples, the operation manager 720 may maintain the operation for processing the downlink channels after detecting third information associated with the third channel, where determining the error is based on maintaining the operation of the UE after detecting the third information.

In some examples, the operation manager 720 may reduce a speed of processing information associated with the second channel based on determining that the uplink transmission associated with the second channel comes before the uplink transmission associated with the first downlink channel. In some cases, the operation for processing the channels of the UE is fixed after setting the operation. In some cases, a priority of the first downlink channel is unchanged after setting the operation for processing the downlink channels of the UE. In some cases, the operation for processing the channels of the UE is fixed after setting the operation.

The extension manager 725 may extend a minimum procedure timing associated with the second channel based on suspending processing the information associated with the first downlink channel. In some examples, the extension manager 725 may process the second channel based on extending the minimum procedure timing. In some examples, the extension manager 725 may identify an offset for the minimum procedure timing based on processing the first downlink channel, where extending the minimum procedure timing is based on identifying the offset and identifying the offset for the minimum procedure timing is based on a UE capability, an SCS, a timing capability associated with the first downlink channel, a timing capability associated with the second channel, or any combination thereof.

In some examples, the extension manager 725 may extend a minimum procedure timing associated the second channel based on determining whether the joint scheduling condition is satisfied. In some examples, the extension manager 725 may process the second channel based on extending the minimum procedure timing. In some examples, the extension manager 725 may identify a first offset for a first minimum procedure timing associated with downlink communication. In some examples, the extension manager 725 may identify a second offset for a second minimum procedure timing associated with uplink communication separate from identifying the first offset for the first minimum procedure timing associated with the downlink communication. In some cases, the minimum procedure timing includes a minimum processing timing to process the DCI received over the second channel. In some cases, the minimum procedure timing includes a minimum preparation timing of the second channel.

The capability manager 730 may determine that processing the information associated with the first downlink channel is capable of being suspended, where setting the operation is based on determining that processing the information associated with the first downlink channel is capable of being dropped.

The joint condition manager 735 may determine whether a joint scheduling condition for processing the first downlink channel and the second channel concurrently is satisfied based on a processing capability of the UE, where the suspension of processing the information of the first downlink channel is based on the joint scheduling condition failing to be satisfied. In some examples, the joint condition manager 735 may identify a quantity of parameters associated with processing the first downlink channel and processing the second channel, where determining whether the joint scheduling condition is satisfied is based on identifying the quantity of parameters, where the parameters include resource blocks, transport blocks, layers, or both.

In some examples, the joint condition manager 735 may determine that a joint scheduling condition for processing the first downlink channel and the second channel concurrently is satisfied based on a processing capability of the UE, where the setting the operation is based on the joint scheduling condition being satisfied.

The priority manager 740 may identify the first priority of the first downlink channel based on detecting the first information. In some examples, the priority manager 740 may identify the second priority of the second channel based on detecting the DCI. In some examples, the priority manager 740 may identify the second priority is greater than the first priority based on identifying the first priority and the second priority. In some examples, the priority manager 740 may identify a field in the first information based on detecting the first information, where identifying the first priority is based on the field in the first information.

In some examples, the priority manager 740 may identify a field in the DCI based on detecting the DCI, where identifying the second priority is based on the field in the DCI. In some examples, the priority manager 740 may identify an uplink timing associated with the first downlink channel based on detecting the first information, where identifying the first priority is based on the uplink timing associated with the first downlink channel. In some examples, the priority manager 740 may identify an uplink timing associated with the second channel based on detecting the DCI, where identifying the second priority is based on the uplink timing associated with the second channel.

In some examples, the priority manager 740 may determine that a priority of the second channel changes from a first priority to a second priority greater than the first priority based on detecting the second DCI, where determining that the uplink transmission associated with the second channel comes before the uplink transmission associated with the first downlink channel is based on determining that the priority of the second channel changes from the first priority to the second priority.

The HARQ manager 745 may identify that a HARQ process identifier associated with the first downlink channel is different than a HARQ process identifier associated with the second channel, where determining that the uplink transmission associated with the second channel comes before the uplink transmission associated with the first downlink channel is based on identifying that the HARQ process identifier associated with the first downlink channel is different than the HARQ process identifier associated with the second channel.

The multiplexing manager 750 may multiplex the uplink transmission associated with the second channel with an uplink transmission associated with the third channel based on detecting the second DCI, where determining that the uplink transmission associated with the second channel comes before the uplink transmission associated with the first downlink channel is based on multiplexing the uplink transmission associated with the second channel with the uplink transmission associated with the third channel.

Figure 8:
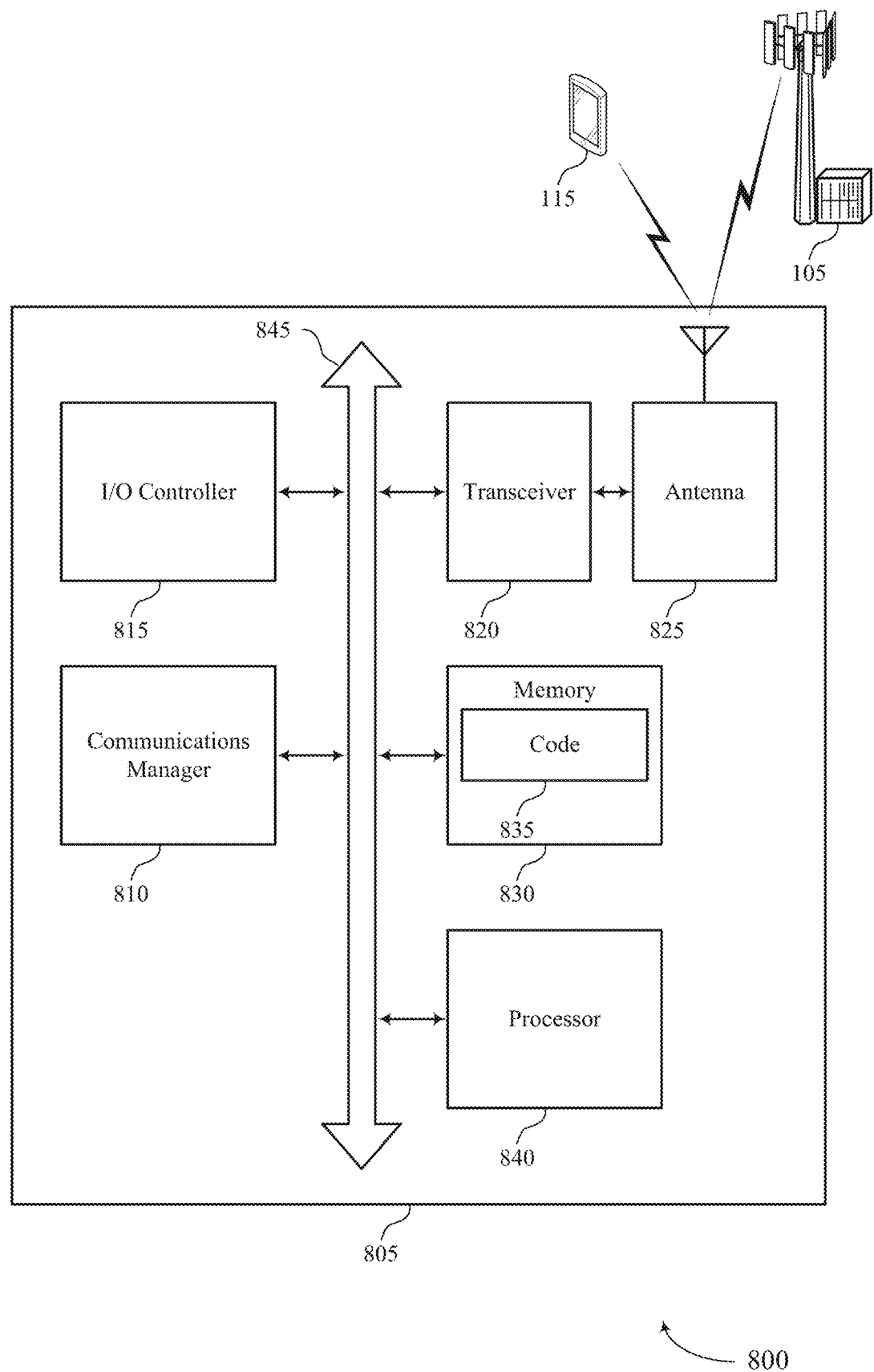
FIG. 8 shows a diagram of a system including a device that supports out-of-order processing in accordance with aspects of the present disclosure.

FIG. 8 shows a diagram of a system 800 including a device 805 that supports out-of-order processing in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may detect first information over a first downlink channel at a first time, detect DCI associated with a second channel at a second time after the first time, determine that transmission resources of the first downlink channel overlap in time with transmission resources of the second channel, suspend processing information associated with the first downlink channel based on determining that the transmission resources overlap, extend a minimum procedure timing associated with the second channel based on suspending processing the information associated with the first downlink channel, and process the second channel based on extending the minimum procedure timing.

The communications manager 810 may also detect first information over a first downlink channel at a first time, detect DCI over a second channel at a second time after the first time, determine whether an uplink transmission associated with the second channel comes before or after an uplink transmission associated with the first downlink channel, determine that the uplink transmission associated with the second channel comes before the uplink transmission associated with the first downlink channel based on setting the operation for processing the channels of the UE, set an operation for processing the channels of the UE based on determining whether the uplink transmission associated with the second channel comes before or after the uplink transmission associated with the first downlink channel, and determine an error based on determining that the uplink transmission associated with the second channel comes before the uplink transmission associated with the first downlink channel.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting out-of-order processing).

The code 835 may include instructions to implement aspects of the present disclosure, including instructions to support wireless communications at a UE. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
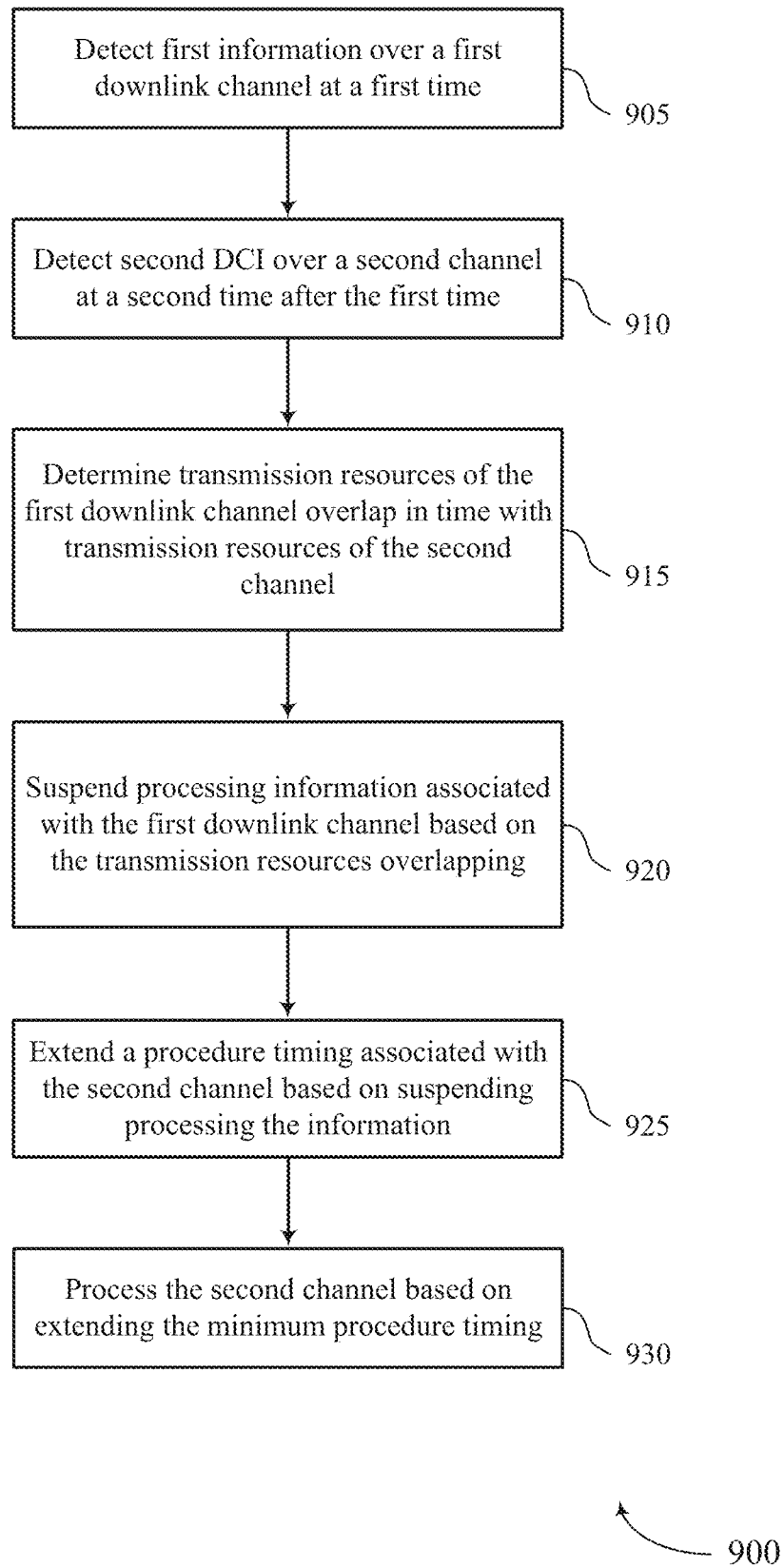
FIGS. 9 through 12 show flowcharts illustrating methods that support out-of-order processing in accordance with aspects of the present disclosure.

FIG. 9 shows a flowchart illustrating a method 900 that supports out-of-order processing in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may detect first information over a first downlink channel at a first time. The operations of 905 may be performed according to the methods described herein. In some examples, aspects of the operations of 905 may be performed by an information manager as described with reference to FIGS. 5 through 8.

At 910, the UE may detect DCI associated with a second channel at a second time after the first time. The operations of 910 may be performed according to the methods described herein. In some examples, aspects of the operations of 910 may be performed by an information manager as described with reference to FIGS. 5 through 8.

At 915, the UE may determine that transmission resources of the first downlink channel overlap in time with transmission resources of the second channel. The operations of 915 may be performed according to the methods described herein. In some examples, aspects of the operations of 915 may be performed by a transmission manager as described with reference to FIGS. 5 through 8.

At 920, the UE may suspend processing information associated with the first downlink channel based on determining that the transmission resources overlap. The operations of 920 may be performed according to the methods described herein. In some examples, aspects of the operations of 920 may be performed by an operation manager as described with reference to FIGS. 5 through 8.

At 925, the UE may extend a minimum procedure timing associated with the second channel based on suspending processing the information associated with the first downlink channel. The operations of 925 may be performed according to the methods described herein. In some examples, aspects of the operations of 925 may be performed by an extension manager as described with reference to FIGS. 5 through 8.

At 930, the UE may process the second channel based on extending the minimum procedure timing. The operations of 930 may be performed according to the methods described herein. In some examples, aspects of the operations of 930 may be performed by an extension manager as described with reference to FIGS. 5 through 8.

In some examples related to FIG. 9, PDSCHs and PUCCHs may be determined or detected as out-of-order for downlink communication, and/or PDCCHs and PUSCHs may be determined or detected as out-of-order for uplink communication.

Figure 10:
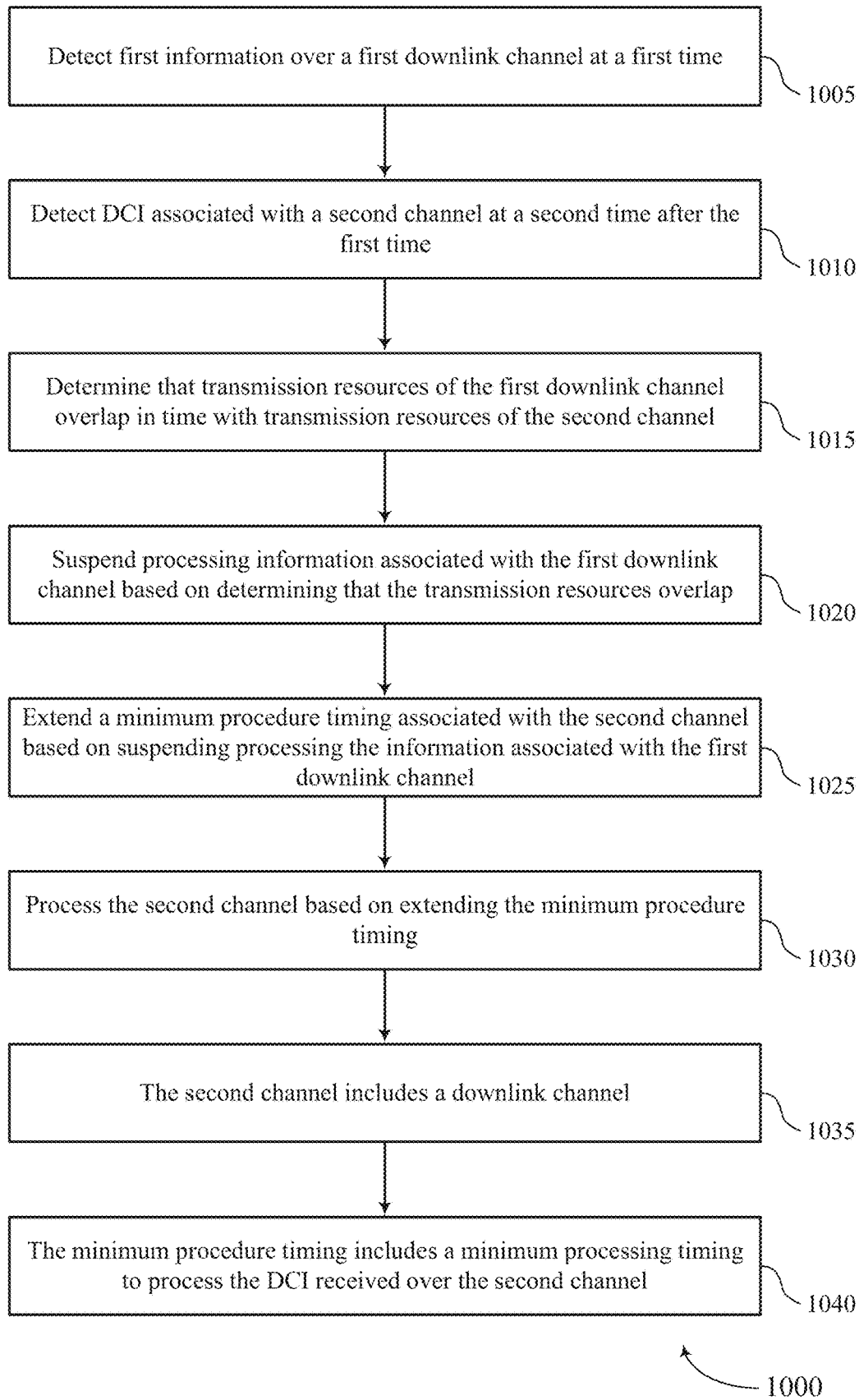

FIG. 10 shows a flowchart illustrating a method 1000 that supports out-of-order processing in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may detect first information over a first downlink channel at a first time. The operations of 1005 may be performed according to the methods described herein. In some examples, aspects of the operations of 1005 may be performed by an information manager as described with reference to FIGS. 5 through 8.

At 1010, the UE may detect DCI associated with a second channel at a second time after the first time. The operations of 1010 may be performed according to the methods described herein. In some examples, aspects of the operations of 1010 may be performed by an information manager as described with reference to FIGS. 5 through 8.

At 1015, the UE may determine that transmission resources of the first downlink channel overlap in time with transmission resources of the second channel. The operations of 1015 may be performed according to the methods described herein. In some examples, aspects of the operations of 1015 may be performed by a transmission manager as described with reference to FIGS. 5 through 8.

At 1020, the UE may suspend processing information associated with the first downlink channel based on determining that the transmission resources overlap. The operations of 1020 may be performed according to the methods described herein. In some examples, aspects of the operations of 1020 may be performed by an operation manager as described with reference to FIGS. 5 through 8.

At 1025, the UE may extend a minimum procedure timing associated with the second channel based on suspending processing the information associated with the first downlink channel. The operations of 1025 may be performed according to the methods described herein. In some examples, aspects of the operations of 1025 may be performed by an extension manager as described with reference to FIGS. 5 through 8.

At 1030, the UE may process the second channel based on extending the minimum procedure timing. The operations of 1030 may be performed according to the methods described herein. In some examples, aspects of the operations of 1030 may be performed by an extension manager as described with reference to FIGS. 5 through 8.

At 1035, the UE may the second channel includes a downlink channel. The operations of 1035 may be performed according to the methods described herein. In some examples, aspects of the operations of 1035 may be performed by an information manager as described with reference to FIGS. 5 through 8.

At 1040, the UE may the minimum procedure timing includes a minimum processing timing to process the DCI received over the second channel. The operations of 1040 may be performed according to the methods described herein. In some examples, aspects of the operations of 1040 may be performed by an extension manager as described with reference to FIGS. 5 through 8.

In some examples related to FIG. 10, PDSCHs and PUCCHs may be determined or detected as out-of-order for downlink communication, and/or PDCCHs and PUSCHs may be determined or detected as out-of-order for uplink communication.

Figure 11:
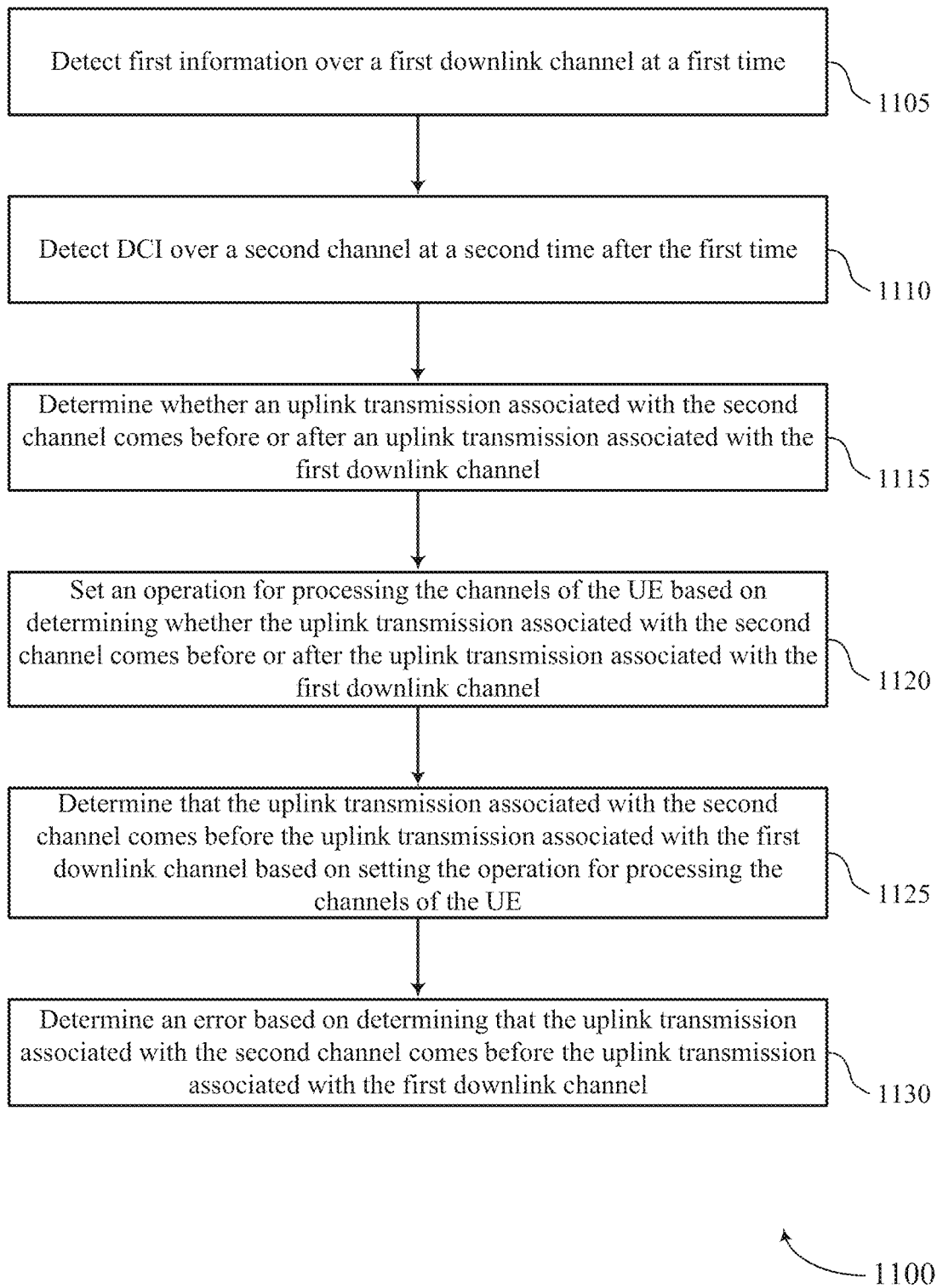

FIG. 11 shows a flowchart illustrating a method 1100 that supports out-of-order processing in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE may detect first information over a first downlink channel at a first time. The operations of 1105 may be performed according to the methods described herein. In some examples, aspects of the operations of 1105 may be performed by an information manager as described with reference to FIGS. 5 through 8.

At 1110, the UE may detect DCI over a second channel at a second time after the first time. The operations of 1110 may be performed according to the methods described herein. In some examples, aspects of the operations of 1110 may be performed by an information manager as described with reference to FIGS. 5 through 8.

At 1115, the UE may determine whether an uplink transmission associated with the second channel comes before or after an uplink transmission associated with the first downlink channel. The operations of 1115 may be performed according to the methods described herein. In some examples, aspects of the operations of 1115 may be performed by a transmission manager as described with reference to FIGS. 5 through 8.

At 1120, the UE may set an operation for processing the channels of the UE based on determining whether the uplink transmission associated with the second channel comes before or after the uplink transmission associated with the first downlink channel. The operations of 1120 may be performed according to the methods described herein. In some examples, aspects of the operations of 1120 may be performed by an operation manager as described with reference to FIGS. 5 through 8.

At 1125, the UE may determine that the uplink transmission associated with the second channel comes before the uplink transmission associated with the first downlink channel based on setting the operation for processing the channels of the UE. The operations of 1125 may be performed according to the methods described herein. In some examples, aspects of the operations of 1125 may be performed by a transmission manager as described with reference to FIGS. 5 through 8.

At 1130, the UE may determine an error based on determining that the uplink transmission associated with the second channel comes before the uplink transmission associated with the first downlink channel. The operations of 1130 may be performed according to the methods described herein. In some examples, aspects of the operations of 1130 may be performed by an operation manager as described with reference to FIGS. 5 through 8.

Figure 12:
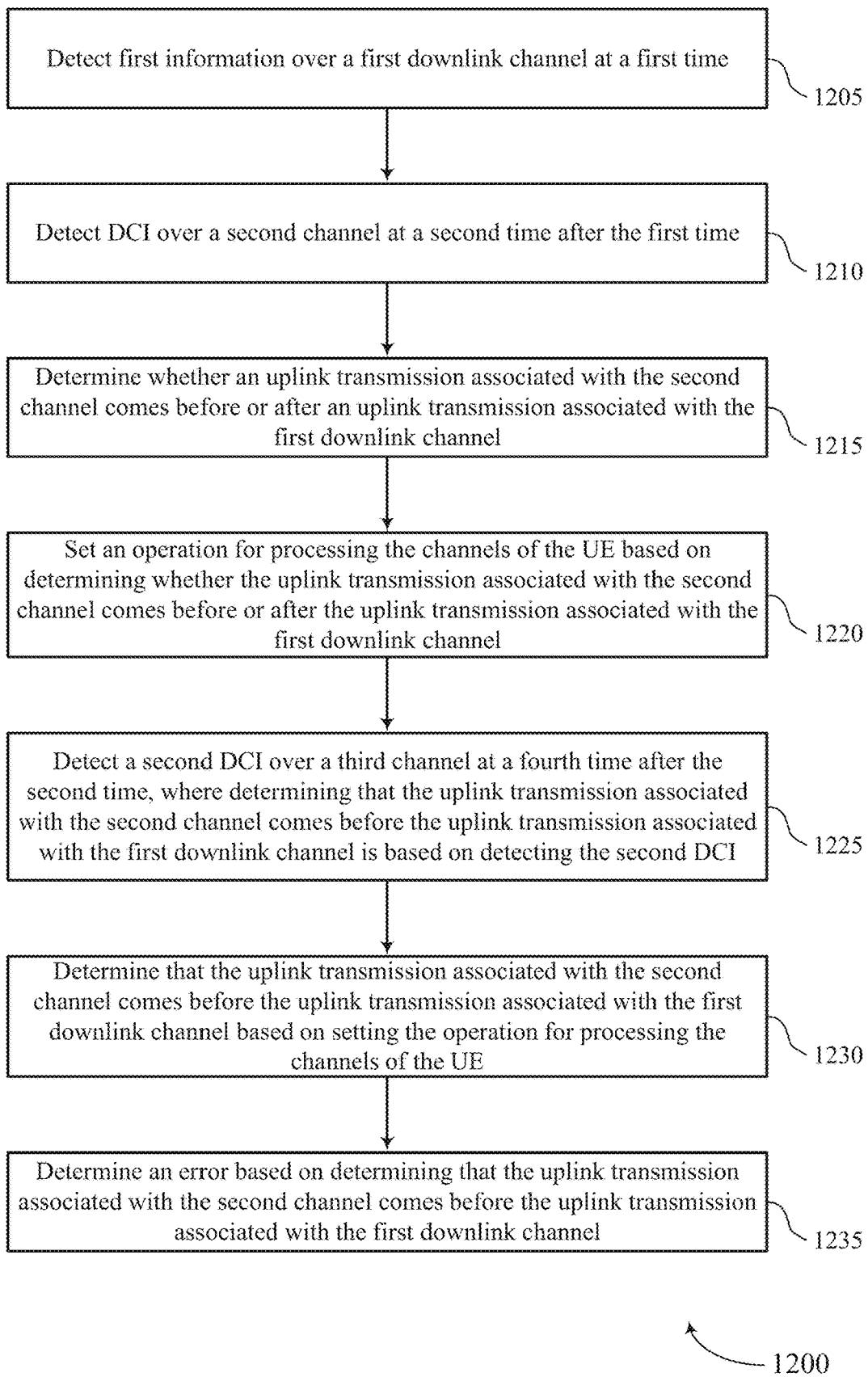

FIG. 12 shows a flowchart illustrating a method 1200 that supports out-of-order processing in accordance with aspects of the present disclosure. The operations of method 1200 may be implemented by a UE 115 or its components as described herein. For example, the operations of method 1200 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1205, the UE may detect first information over a first downlink channel at a first time. The operations of 1205 may be performed according to the methods described herein. In some examples, aspects of the operations of 1205 may be performed by an information manager as described with reference to FIGS. 5 through 8.

At 1210, the UE may detect DCI over a second channel at a second time after the first time. The operations of 1210 may be performed according to the methods described herein. In some examples, aspects of the operations of 1210 may be performed by an information manager as described with reference to FIGS. 5 through 8.

At 1215, the UE may determine whether an uplink transmission associated with the second channel comes before or after an uplink transmission associated with the first downlink channel. The operations of 1215 may be performed according to the methods described herein. In some examples, aspects of the operations of 1215 may be performed by a transmission manager as described with reference to FIGS. 5 through 8.

At 1220, the UE may set an operation for processing the channels of the UE based on determining whether the uplink transmission associated with the second channel comes before or after the uplink transmission associated with the first downlink channel. The operations of 1220 may be performed according to the methods described herein. In some examples, aspects of the operations of 1220 may be performed by an operation manager as described with reference to FIGS. 5 through 8.

At 1225, the UE may detect a second DCI over a third channel at a fourth time after the second time, where determining that the uplink transmission associated with the second channel comes before the uplink transmission associated with the first downlink channel is based on detecting the second DCI. The operations of 1225 may be performed according to the methods described herein. In some examples, aspects of the operations of 1225 may be performed by an information manager as described with reference to FIGS. 5 through 8.

At 1230, the UE may determine that the uplink transmission associated with the second channel comes before the uplink transmission associated with the first downlink channel based on setting the operation for processing the channels of the UE. The operations of 1230 may be performed according to the methods described herein. In some examples, aspects of the operations of 1230 may be performed by a transmission manager as described with reference to FIGS. 5 through 8.

At 1235, the UE may determine an error based on determining that the uplink transmission associated with the second channel comes before the uplink transmission associated with the first downlink channel. The operations of 1235 may be performed according to the methods described herein. In some examples, aspects of the operations of 1235 may be performed by an operation manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    transmitting a processing capability of the UE associated with a lower priority traffic with a first subset of a bandwidth and a higher priority traffic with a second subset of the bandwidth, the processing capability to support out-of-order scheduling that comprises extending a minimum preparation timing;
    detecting first information over a downlink channel at a first time;
    detecting downlink control information (DCI) associated with an uplink channel at a second time after the first time;
    determining that first uplink transmission resources of a first uplink transmission scheduled by the DCI overlap in time with second uplink transmission resources of a second uplink transmission associated with the downlink channel;
    suspending processing information associated with the downlink channel based at least in part on determining that the first uplink transmission resources overlap with the second uplink transmission resources;
    extending, by an offset, the minimum preparation timing for processing an uplink transmission to communicate over the uplink channel based at least in part on determining that the first uplink transmission resources overlap with the second uplink transmission resources and the processing capability of the UE; and processing the uplink channel during at least a portion of the extended minimum preparation timing.

2. The method of claim 1, further comprising:
identifying the offset for the minimum preparation timing based at least in part on one or more conditions associated with processing the downlink channel, the one or more conditions comprising subcarrier spacing, a timing capability associated with the downlink channel, a timing capability associated with the uplink channel, or any combination thereof, wherein extending the minimum preparation timing is based at least in part on identifying the offset.

3. The method of claim 1, further comprising:
setting an operation for processing the downlink channel and the uplink channel of the UE based at least in part on determining that the first uplink transmission resources overlap in time with the second uplink transmission resources, wherein suspending processing of the information associated with the downlink channel is based at least in part on setting the operation for processing;
identifying a trigger event associated with a third channel after setting the operation for processing the downlink channel and the uplink channel of the UE; and
maintaining a priority of the downlink channel based at least in part on identifying the trigger event.

4. The method of claim 3, wherein:
the operation for processing the downlink channel and the uplink channel of the UE is fixed after setting the operation; and
the priority of the downlink channel is unchanged after setting the operation for processing the downlink channel and the uplink channel of the UE.

5. The method of claim 3, further comprising:
determining that processing the information associated with the downlink channel is suspended, wherein setting the operation is based at least in part on determining that processing the information associated with the downlink channel is suspended.

6. The method of claim 1, further comprising:
determining whether a joint scheduling condition for processing the downlink channel and the uplink channel concurrently is satisfied based at least in part on the processing capability of the UE, wherein the suspension of processing of the information associated with the downlink channel is based at least in part on the joint scheduling condition failing to be satisfied.

7. The method of claim 6, further comprising:
identifying a quantity of parameters associated with processing the downlink channel and processing the uplink channel, wherein determining whether the joint scheduling condition is satisfied is based at least in part on identifying the quantity of parameters, wherein the quantity of parameters comprise resource blocks, transport blocks, layers, or a combination thereof.

8. The method of claim 6, further comprising:
extending the minimum preparation timing based at least in part on determining the joint scheduling condition is satisfied.

9. The method of claim 1, further comprising:
identifying a second priority of the downlink channel based at least in part on detecting the first information;
identifying a first priority of the uplink channel based at least in part on detecting the DCI; and
identifying the first priority is greater than the second priority based at least in part on identifying the second priority and the first priority.

10. The method of claim 9, further comprising:
identifying a field in the first information based at least in part on detecting the first information, wherein identifying the second priority is based at least in part on the field in the first information; and
identifying a field in the DCI based at least in part on detecting the DCI, wherein identifying the first priority is based at least in part on the field in the DCI.

11. The method of claim 9, further comprising:
identifying an uplink timing associated with the downlink channel based at least in part on detecting the first information, wherein identifying the second priority is based at least in part on the uplink timing associated with the downlink channel; and
identifying an uplink timing associated with the uplink channel based at least in part on detecting the DCI, wherein identifying the first priority is based at least in part on the uplink timing associated with the uplink channel.

12. The method of claim 1, wherein:
the downlink channel comprises a physical downlink control channel (PDCCH) and the uplink channel comprises a physical uplink control channel (PUCCH); and
the first uplink transmission resources comprise first physical uplink shared channel (PUSCH) transmission resources and the second uplink transmission resources comprise second PUSCH transmission resources.

13. The method of claim 1, wherein the downlink channel and the uplink channel are associated with an active bandwidth part of a serving cell.

14. The method of claim 1, wherein the downlink channel and the uplink channel are associated with different serving cells.

15. The method of claim 1, wherein the downlink channel and the uplink channel are associated with a same serving cell.

16. The method of claim 1, further comprising:
identifying that a hybrid automatic repeat request (HARQ) process identifier associated with the downlink channel is different than a HARQ process identifier associated with the uplink channel, wherein determining that an uplink transmission associated with the uplink channel comes before an uplink transmission associated with the downlink channel is based at least in part on identifying that the HARQ process identifier associated with the downlink channel is different than the HARQ process identifier associated with the uplink channel.

17. The method of claim 1, further comprising:
identifying a first offset for a first minimum preparation timing associated with downlink communication; and
identifying a second offset for a second minimum preparation timing associated with uplink communication separate from identifying the first offset for the first minimum preparation timing associated with the downlink communication.

18. A method for wireless communication at a user equipment (UE), comprising:
transmitting a processing capability of the UE associated with a lower priority traffic with a first subset of a bandwidth and a higher priority traffic with a second subset of the bandwidth, the processing capability to support out-of-order scheduling that comprises extending a minimum preparation timing;
detecting first information over a downlink channel at a first time;

detecting downlink control information (DCI) associated with an uplink channel at a second time after the first time;
determining an uplink transmission associated with the uplink channel comes before an uplink transmission associated with the downlink channel;
setting an operation for processing the downlink channel and the uplink channel of the UE based at least in part on determining the uplink transmission associated with the uplink channel comes before the uplink transmission associated with the downlink channel and the processing capability;
determining that the uplink transmission associated with the uplink channel comes before the uplink transmission associated with the downlink channel based at least in part on setting the operation for processing the downlink channel and the uplink channel of the UE;
determining an error based at least in part on determining that the uplink transmission associated with the uplink channel comes before the uplink transmission associated with the downlink channel.

19. The method of claim 18, further comprising:
detecting a second DCI over a third channel at a third time after the second time, wherein determining that the uplink transmission associated with the uplink channel comes before the uplink transmission associated with the downlink channel is based at least in part on detecting the second DCI.

20. The method of claim 19, further comprising:
multiplexing the uplink transmission associated with the uplink channel with an uplink transmission associated with the third channel based at least in part on detecting the second DCI, wherein determining that the uplink transmission associated with the uplink channel comes before the uplink transmission associated with the downlink channel is based at least in part on multiplexing the uplink transmission associated with the uplink channel with the uplink transmission associated with the third channel.

21. The method of claim 19, further comprising:
determining that a priority of the uplink channel is a first priority greater than a second priority based at least in part on detecting the second DCI, wherein determining that the uplink transmission associated with the uplink channel comes before the uplink transmission associated with the downlink channel is based at least in part on determining that the priority of the uplink channel is the first priority.

22. The method of claim 18, further comprising:
reducing a speed of processing information associated with the uplink channel based at least in part on determining that the uplink transmission associated with the uplink channel comes before the uplink transmission associated with the downlink channel.

23. The method of claim 18, wherein the operation for processing the downlink channel and the uplink channel of the UE is fixed after setting the operation.

24. The method of claim 18, further comprising:
determining that a joint scheduling condition for processing the downlink channel and the uplink channel concurrently is satisfied based at least in part on a processing capability of the UE, wherein the setting the operation is based at least in part on the joint scheduling condition being satisfied.

25. The method of claim 18, wherein the downlink channel and the uplink channel are associated with an active bandwidth part of a serving cell.

26. An apparatus for wireless communication at a user equipment (UE), comprising:
a processor,
memory in electronic communication with the processor; and
instructions stored in the memory and executable by the processor to cause the apparatus to:
transmit a processing capability of the UE associated with a lower priority traffic with a first subset of a bandwidth and a higher priority traffic with a second subset of the bandwidth, the processing capability to support out-of-order scheduling that comprises extending a minimum preparation timing;
detect first information over a downlink channel at a first time;
detect downlink control information (DCI) associated with an uplink channel at a second time after the first time;
determine that first uplink transmission resources of a first uplink transmission scheduled by the DCI overlap in time with second uplink transmission resources of a second uplink transmission associated with the downlink channel;
suspend processing information associated with the downlink channel based at least in part on determining that the first uplink transmission resources overlap with the second uplink transmission resources;
extend, by an offset, the minimum preparation timing for processing an uplink transmission to communicate over the uplink channel based at least in part on determining that the first uplink transmission resources overlap with the second uplink transmission resources and the processing capability of the UE; and
process the uplink channel during at least a portion of the extended minimum preparation timing.

27. An apparatus for wireless communication at a user equipment (UE), comprising:
a processor,
memory in electronic communication with the processor; and
instructions stored in the memory and executable by the processor to cause the apparatus to:
transmit a processing capability of the UE associated with a lower priority traffic with a first subset of a bandwidth and a higher priority traffic with a second subset of the bandwidth, the processing capability to support out-of-order scheduling that comprises extending a minimum preparation timing;
detect first information over a downlink channel at a first time;
detect downlink control information (DCI) associated with an uplink channel at a second time after the first time;
determine an uplink transmission associated with the uplink channel comes before an uplink transmission associated with the downlink channel;
set an operation for processing the downlink channel and the uplink channel of the UE based at least in part on determining the uplink transmission associated with the uplink channel comes before the uplink transmission associated with the downlink channel and the processing capability;
determine that the uplink transmission associated with the uplink channel comes before the uplink transmission associated with the downlink channel based at least in part on setting the operation for processing the downlink channel and the uplink channel of the UE;

determine an error based at least in part on determining that the uplink transmission associated with the uplink channel comes before the uplink transmission associated with the downlink channel.

\* \* \* \* \*